(12) United States Patent
DeLine et al.

(10) Patent No.: US 7,542,575 B2
(45) Date of Patent: Jun. 2, 2009

(54) DIGITAL SOUND PROCESSING SYSTEM FOR A VEHICLE

(75) Inventors: Jonathan E DeLine, Raleigh, NC (US); Niall R Lynam, Holland, MI (US); Ralph A Spooner, Holland, MI (US); Phillip A March, Holland, MI (US)

(73) Assignee: Donnelly Corp., Holland, MI (US)

( * ) Notice: Subject to any disclaimer, the term of this patent is extended or adjusted under 35 U.S.C. 154(b) by 1092 days.

(21) Appl. No.: 11/052,623

(22) Filed: Feb. 7, 2005

(65) Prior Publication Data

US 2005/0156753 A1 Jul. 21, 2005

Related U.S. Application Data

(63) Continuation-in-part of application No. 10/190,809, filed on Jul. 8, 2002, now Pat. No. 6,906,632, which is a continuation-in-part of application No. 09/466,010, filed on Dec. 17, 1999, now Pat. No. 6,420,975, which is a continuation-in-part of application No. 09/396,179, filed on Sep. 14, 1999, now Pat. No. 6,278,377, which is a continuation-in-part of application No. 09/382,720, filed on Aug. 25, 1999, now Pat. No. 6,243,003, said application No. 09/466,010 is a continuation-in-part of application No. 09/449,121, filed on Nov. 24, 1999, now Pat. No. 6,428,172, said application No. 10/190,809 is a continuation-in-part of application No. 09/687,778, filed on Oct. 13, 2000, now Pat. No. 6,547,133, which is a continuation of application No. 09/057,428, filed on Apr. 8, 1998, now Pat. No. 6,158,655, said application No. 09/466,010 is a continuation-in-part of application No. 09/448,700, filed on Nov. 24, 1999, now Pat. No. 6,329,925, and a continuation-in-part of application No. 09/433,467, filed on Nov. 4, 1999, now Pat. No. 6,326,613.

(51) Int. Cl.
H04B 1/00 (2006.01)
H04R 1/02 (2006.01)

(52) U.S. Cl. .................. 381/86; 381/71.4; 381/122; 381/91

(58) Field of Classification Search .............. 381/86, 381/91, 92, 122, 111–113, 355–356, 359, 381/361, 365, 71.1, 71.4, 94.1–94.3, 71.7; 362/494

See application file for complete search history.

(56) References Cited

U.S. PATENT DOCUMENTS 2,972,018 A  2/1961  Hawley et al. ................. 179/1

(Continued)

FOREIGN PATENT DOCUMENTS

DE  3605704  8/1987

(Continued)

OTHER PUBLICATIONS

Adaptive Noise Cancelling: Principles and Applications, Proc. IEEE, vol. 63, pp. 1692-1716, Dec. 1975 by B. Widrow et al.

(Continued)

Primary Examiner—Xu Mei
(74) Attorney, Agent, or Firm—Van Dyke, Gardner, Linn & Burkhart, LLP

(57) ABSTRACT

A digital sound processing system suitable for use in a vehicle comprises an interior rearview mirror assembly that includes at least a first microphone and a second microphone. The first microphone generates a first signal indicative of a vocal input with vehicle cabin noise included therewith and the second microphone generates a second signal indicative of a vocal input with vehicle cabin noise included therewith. A digital signal processor is provided that processes the first signal and the second signal and that provides an output signal with reduced vehicle cabin noise. The digital signal processor preferably comprises a microprocessor executing at least one million instructions per second.

79 Claims, 10 Drawing Sheets

U.S. PATENT DOCUMENTS

| | | | |
|---|---|---|---|
| 3,098,121 A | 7/1963 | Wadsworth | 179/1 |
| 3,841,732 A | 10/1974 | Marks | 350/160 R |
| 4,052,568 A | 10/1977 | Jankowski | 179/15 |
| 4,187,396 A | 2/1980 | Luhowy | 179/1 |
| 4,447,808 A | 5/1984 | Marcus | 340/696 |
| 4,484,344 A | 11/1984 | Mai et al. | 381/46 |
| 4,736,432 A | 4/1988 | Cantrell | 381/83 |
| 4,833,719 A | 5/1989 | Carme et al. | 381/72 |
| 4,878,188 A | 10/1989 | Ziegler, Jr. | 364/724.01 |
| 4,930,742 A | 6/1990 | Schofield et al. | |
| 4,959,865 A | 9/1990 | Stettiner et al. | 381/46 |
| 4,977,600 A | 12/1990 | Ziegler | 381/71 |
| 5,012,077 A | 4/1991 | Takano | 235/380 |
| 5,033,082 A | 7/1991 | Eriksson et al. | 379/410 |
| 5,072,380 A | 12/1991 | Randelman et al. | 364/406 |
| 5,138,664 A | 8/1992 | Kimura et al. | 381/72 |
| 5,178,448 A | 1/1993 | Adams et al. | 362/83.1 |
| 5,251,263 A | 10/1993 | Andrea et al. | 381/71 |
| 5,310,999 A | 5/1994 | Claus et al. | 235/384 |
| 5,381,473 A | 1/1995 | Andrea et al. | 379/387 |
| 5,455,716 A | 10/1995 | Suman et al. | 359/838 |
| 5,479,155 A | 12/1995 | Zeinstra et al. | 340/825.22 |
| 5,485,520 A | 1/1996 | Chaum et al. | 380/24 |
| 5,530,240 A | 6/1996 | Larson et al. | 250/214 |
| 5,546,458 A | 8/1996 | Iwami | |
| 5,550,677 A | 8/1996 | Schofield et al. | 359/604 |
| 5,566,224 A | 10/1996 | Ul Azam et al. | 379/58 |
| 5,590,038 A | 12/1996 | Pitroda | 395/241 |
| 5,631,638 A | 5/1997 | Kaspar et al. | 340/902 |
| 5,649,756 A | 7/1997 | Adams et al. | 362/83.1 |
| 5,663,548 A | 9/1997 | Hayashi et al. | 235/384 |
| 5,671,996 A | 9/1997 | Bos et al. | 362/83.1 |
| 5,673,325 A | 9/1997 | Andrea et al. | 381/92 |
| 5,673,994 A | 10/1997 | Fant, Jr. et al. | 362/831 |
| 5,680,263 A | 10/1997 | Zimmermann et al. | 359/872 |
| 5,710,702 A | 1/1998 | Hayashi et al. | 364/423.098 |
| 5,715,093 A | 2/1998 | Schierbeek et al. | 359/601 |
| 5,715,321 A | 2/1998 | Andrea et al. | 381/92 |
| 5,724,187 A | 3/1998 | Varaprasad et al. | 359/608 |
| 5,732,074 A | 3/1998 | Spaur et al. | 370/313 |
| 5,732,143 A | 3/1998 | Andrea et al. | 381/71.6 |
| 5,760,962 A | 6/1998 | Schofield et al. | 359/604 |
| 5,786,772 A | 7/1998 | Schofield et al. | 340/903 |
| 5,793,027 A | 8/1998 | Baik | 235/380 |
| 5,796,176 A | 8/1998 | Kramer et al. | 307/10.1 |
| 5,798,575 A | 8/1998 | O'Farrell et al. | 307/10.1 |
| 5,798,688 A | 8/1998 | Schofield | 340/438 |
| 5,813,745 A | 9/1998 | Fant, Jr. et al. | 362/83.1 |
| 5,820,245 A | 10/1998 | Desmond et al. | 362/83.1 |
| 5,825,897 A | 10/1998 | Andrea et al. | 381/71.6 |
| 5,872,513 A | 2/1999 | Fitzgibbon et al. | 340/539 |
| 5,877,897 A | 3/1999 | Schofield et al. | 359/604 |
| 5,878,353 A | 3/1999 | ul Azam et al. | 455/550 |
| 5,909,495 A | 6/1999 | Andrea | 381/67 |
| 5,910,854 A | 6/1999 | Varaprasad et al. | 359/273 |
| 5,924,212 A | 7/1999 | Domanski | 33/355 |
| 5,929,786 A | 7/1999 | Schofield et al. | 340/903 |
| 5,938,321 A | 8/1999 | Bos et al. | 362/494 |
| 5,940,503 A | 8/1999 | Palett et al. | 379/454 |
| 5,962,833 A | 10/1999 | Hayashi | 235/384 |
| 5,971,552 A | 10/1999 | O'Farrell et al. | 359/604 |
| 5,995,898 A | 11/1999 | Tuttle | 701/102 |
| 6,011,518 A | 1/2000 | Yamagishi et al. | 343/713 |
| 6,019,411 A | 2/2000 | Carter et al. | 296/37.7 |
| 6,098,879 A | 8/2000 | Terranova | 235/384 |
| 6,124,886 A | 9/2000 | DeLine et al. | 348/148 |
| 6,139,172 A | 10/2000 | Bos et al. | 362/494 |
| 6,152,590 A | 11/2000 | Fürst et al. | 362/545 |
| 6,154,306 A | 11/2000 | Varaprasad et al. | 359/273 |
| 6,158,655 A | 12/2000 | DeVries, Jr. et al. | 235/380 |
| 6,163,083 A | 12/2000 | Kramer et al. | 307/10.1 |
| 6,172,613 B1 | 1/2001 | DeLine et al. | 340/815.4 |
| 6,175,164 B1 | 1/2001 | O'Farrell et al. | 307/10.1 |
| 6,201,642 B1 | 3/2001 | Bos | 359/565 |
| 6,222,447 B1 | 4/2001 | Schofield et al. | 340/461 |
| 6,243,003 B1 | 6/2001 | DeLine et al. | |
| 6,278,377 B1 | 8/2001 | DeLine et al. | 340/815.4 |
| 6,299,316 B1 | 10/2001 | Fletcher et al. | 359/604 |
| 6,326,613 B1 | 12/2001 | Heslin et al. | 250/239 |
| 6,329,925 B1 | 12/2001 | Skiver et al. | 340/815.4 |
| 6,340,850 B2 | 1/2002 | O'Farrell et al. | 307/10.1 |
| 6,355,920 B1 | 3/2002 | Schofield et al. | 250/206 |
| 6,366,213 B2 | 4/2002 | DeLine et al. | 340/815.4 |
| 6,386,742 B1 | 5/2002 | DeLine et al. | 362/494 |
| 6,420,975 B1 | 7/2002 | DeLine et al. | 340/815.4 |
| 6,428,172 B1 | 8/2002 | Hutzel et al. | 359/838 |
| 6,466,136 B2 | 10/2002 | DeLine et al. | |
| 6,483,438 B2 | 11/2002 | DeLine et al. | |
| 6,501,387 B2 | 12/2002 | Skiver et al. | |
| 6,547,133 B1 | 4/2003 | DeVries, Jr. et al. | |
| 6,553,308 B1 | 4/2003 | Uhlmann et al. | |
| 6,590,193 B2 | 7/2003 | Schofield et al. | |
| 6,590,719 B2 | 7/2003 | Bos | |
| 6,593,565 B2 | 7/2003 | Heslin et al. | |
| 6,717,524 B2 | 4/2004 | DeLine et al. | |
| 6,717,610 B1 | 4/2004 | Bos et al. | |
| 6,756,912 B2 | 6/2004 | Skiver et al. | |
| 6,774,356 B2 | 8/2004 | Heslin et al. | |
| 6,774,810 B2 | 8/2004 | DeLine et al. | |
| 6,801,632 B2 * | 10/2004 | Olson | 381/365 |
| 6,832,719 B2 | 12/2004 | DeVries et al. | |
| 7,120,261 B1 * | 10/2006 | Turnbull et al. | 381/86 |
| 7,360,932 B2 * | 4/2008 | Uken et al. | 362/494 |
| 7,443,988 B2 * | 10/2008 | Turnbull et al. | 381/86 |
| 7,447,320 B2 * | 11/2008 | Bryson et al. | 381/86 |
| 2003/0020603 A1 | 1/2003 | DeLine et al. | |
| 2003/0191583 A1 | 10/2003 | Uhlmann et al. | |
| 2004/0021956 A1 | 2/2004 | Bos | |
| 2004/0094692 A1 | 5/2004 | Schofield et al. | |
| 2004/0199310 A1 | 10/2004 | DeLine et al. | |
| 2004/0240090 A1 | 12/2004 | Skiver et al. | |
| 2005/0006575 A1 | 1/2005 | Heslin | |
| 2005/0007256 A1 | 1/2005 | DeLine et al. | |

FOREIGN PATENT DOCUMENTS

| | | |
|---|---|---|
| EP | 0979758 | 2/2000 |
| JP | 3169199 | 7/1991 |
| JP | 10036144 A | 2/1998 |
| JP | 10330131 A | 12/1998 |
| JP | 11050006 A | 2/1999 |
| JP | 11131880 | 5/1999 |
| WO | WO 9801847 | 7/1997 |
| WO | WO 9734780 | 9/1997 |
| WO | WO 9817046 | 4/1998 |
| WO | WO 9858448 | 6/1998 |
| WO | WO 9830415 | 7/1998 |
| WO | WO 0072463 A2 | 11/2000 |

OTHER PUBLICATIONS

Adaptive Noise Cancelling for Speech Signals, IEEE Trans. Acoust. Speech and Signal Proc., vol. ASSP-26, No. 5, Oct. 1978 by M. Sambur.

"Evaluation of Several Adaptive Algorithms for Canceling Acoustic Noise in Mobile Radio Environments", by Liberti, Joseph C. et al., IEEE Vehicular Technology Conference, vol. 41, May 19, 1991, pp. 126-132.

"On the Importance of the Microphone Position for Speech Recognition in the Car", by Johan Smolders et al., 1994 IEEE International Conference on Adelaide, New York, NY, Apr. 19, 1994, pp. 429-432.

Commonly assigned co-pending U.S. Appl. No. 10/793,500, filed Mar. 4, 2004, entitled Vehicle System for a Vehicle.

* cited by examiner

DIGITAL SOUND PROCESSING SYSTEM FOR A VEHICLE

CROSS REFERENCE TO RELATED APPLICATIONS

This application is a continuation-in-part application Ser. No. 10/190,809, filed on Jul. 8, 2002 now U.S. Pat. No. 6,906,632, which is a continuation-in-part of application Ser. No. 09/466,010, filed on Dec. 17, 1999, now U.S. Pat. No. 6,420,975, which is a continuation-in-part of application Ser. No. 09/396,179, filed Sept. 14, 1999, now U.S. Pat. No. 6,278,377, which is a continuation-in-part of application Ser. No. 09/382,720, filed Aug. 25, 1999, now U.S. Pat. No. 6,243,003, and application Ser. No. 09/466,010 is a continuation-in-pan of application Ser. No. 09/449,121, filed Nov. 24, 1999, now U.S. Pat. No. 6,428,172, and application Ser. No. 09/466,010 is a continuation-in-part of application Ser. No. 09/433,467, filed Nov. 4, 1999, now U.S. Pat. No. 6,326,613, and application Ser. No. 09/466,010 is a continuation-in-part of application Ser. No. 09/448,700, filed Nov. 24, 1999, now U.S. Pat. No. 6,329,925, and application Ser. No. 10/190,809 is a continuation-in-part of application Ser. No. 09/687,778, filed Oct. 13, 2300, now U.S. Pat. No. 6,547,133, which is a continuation of application Set. No. 09/057,428, filed Apr. 8, 1998, now U.S. Pat. No. 6,158,655, all of which are hereby incorporated herein by reference in their entireties.

BACKGROUND OF THE INVENTION

The present invention relates generally to an interior rearview mirror sound processing system and, more particularly, to an interior rearview mirror sound processing system including a microphone for use in receiving an audio signal within a vehicle and a digital sound processing system for providing a vocal signature signal indicative of speech detected by the vehicular microphone with an enhanced vocal content and a reduced ambient noise content.

Many vehicles today use hands-free cellular telephones or other communication devices to avoid problems which may arise when a driver of a vehicle has to hold a telephone while driving the vehicle. These hand-free devices include a microphone to receive an audio signal from within the vehicle. It is known to include directional or polar microphones in these devices, which constrain the area covered by the microphone to an area where voices would typically originate, such as a driver's head area. In certain applications, these microphones are implemented in an interior rearview mirror, such that the microphone is positioned in front of the driver and at approximately the same level as the head of the driver. However, the location of the mirror may be at a distance which is beyond the optimal operative range of the microphone, due to the forward slant of the windshield away from the driver and the location at which the mirror is mounted thereto. Furthermore, rearview mirrors are adjustable to account for different sized drivers, which may result in the microphone being directed away from the head of the driver or other occupants, and thus receiving other noises from within the cabin of the vehicle.

An additional issue with known mirror-mounted microphones (such as interior rearview mirror assemblies with a microphone located within the movable mirror housing and/or the mirror mounting bracket, such as a header mounting bracket) is that typically, audio or communication devices in vehicles are optional. Accordingly, separate mirror housings and wiring bundles or harnesses are required to accommodate the standard mirror and the optional mirror which includes the microphone or other accessories such as a vehicle alarm status indicator. This leads to a proliferation of parts within the vehicle assembly plants, which further results in increased costs to the vehicle.

Many vehicles which offer hands-free communication devices mount the microphones in a headliner console rearward of the windshield and along the ceiling of the interior cabin of the vehicle. By mounting the microphones in the headliner console, the microphones may be in a substantially fixed position and directed toward the driver head area within the vehicle. However, this positions the microphone substantially above the driver where it may not optimally pick up the voice signal of the driver, since the driver's voice is directed generally forwardly while the driver continues to view the roadway, while the microphone is directed generally downwardly from the ceiling. Furthermore, locating the microphones in a headliner console adds to the vehicle costs, due to additional installation processes and more costly parts, such as additional ceiling trim, console components and the like. Also, locating the microphone in a headliner console fails to avoid the requirement of at least two separate headliner consoles to accommodate the optional microphone verses a console without the microphone.

An additional issue with communication devices in vehicles is that when the device is in use, the user may not be certain that the message conveyed is properly received by the other party. This may be especially troublesome when the other party is an automated voice system which responds to a particular voice communication. When a remote receiving system is operating in voice recognition mode, it is particularly important that alphanumeric speech text is accurately received and interpreted by the remote party. Thus, for example, if the vehicle operator says "Call Dan at extension three-five-seven-nine-six", it is important that the remote party (which often is a computer-based machine voice recognition system that is operating in voice recognition mode) interprets this correctly and initiates the requested call, e.g., to Dan at Ext: 35796. In a vehicle environment, ambient noise from the like of traffic noise, road noise, wind noise, HVAC noise and engine noise can make it difficult for the remote party to voice recognize with clarity and accuracy the message being telecommunicated.

Therefore, there is a need in the art for a microphone which may be mounted generally forwardly of the driver of the vehicle, and fixedly mounted to maintain proper orientation with respect to the driver of the vehicle. There is also a need for a vehicular mirror based sound processing system that reliably and economically receives sound inputs from the vehicle interior cabin while the vehicle is operating, that distinguishes vocal speech input from non-vocal ambient noise, and that provides an output that is characteristic of the true speech input being provided, devoid of any confusing/interfering ambient noise.

SUMMARY OF THE INVENTION

The present invention is intended to provide a vehicular sound processing system, preferably with some, and most preferably with most or all, of the system components provided as part of the interior rearview mirror assembly of the vehicle. The present invention also encompasses providing an indicator for a microphone or accessory module, and preferably for an indicator for a microphone mounted in, at or on an interior rearview mirror assembly to comprise part of an interior rearview mirror system. The microphone or accessory module preferably mounts along an upper, inner edge of the windshield of a vehicle to direct the microphone, which is preferably a polar or directional microphone, generally downwardly and rearwardly toward the driver of the vehicle, and most preferably, towards the head of the driver, in order to best pick up vocal communication from the driver's mouth. The indicator provides an indication signal, preferably a visual indication signal, to the user of the microphone which indicates whether the voice communication from the user is adequately being received and preferably whether the communication is adequately being discriminated from other audible inputs received by the microphone that are non-vocal. Thus, the indicator provides an indication signal that an adequately high vocal signal to audible non-vocal noise discrimination ratio is occurring. The accessory module is adaptable for use on a vehicle with a rearview mirror which is separately mounted on the interior surface of the windshield such as a button mounted rearview mirror, and may further include a wire cover extending downwardly from the module to the mounting button of the rearview mirror. The wire cover functions to cover any mirror wiring harness which may connect the rearview mirror assembly to a vehicle wiring harness, typically within the headliner of the vehicle.

According to an aspect of the present invention, an audio system for a vehicle comprises a microphone and an indicator. The vehicle has a cabin and a windshield. The microphone is operable to receive audio signals from within the cabin. The audio signals include vocal signals generated by the human voices of vehicle occupants. The indicator is operable to communicate a receiving status of the audio signals to a user of the audio system and is adapted to indicate to the driver and/or other occupants of the vehicle that a voice generated vocal signal is being appropriately received by the audio system that the microphone feeds, and that the vocal signal is being appropriately and substantially discriminated compared to other audible non-vocal signals picked up by the microphone, such as HVAC noise, wind noise, music and the like. The indicator may communicate a receiving status of the microphone and/or a receiving status of another party remote from the vehicle. Thus, the indicator operates to confirm to the driver that verbal inputs/commands/messages/sentences, as spoken by the driver have been received at the microphone and processed by the audio system with sufficient clarity and volume, such that the verbal inputs/commands/messages/ sentences have been adequately correctly received. This is of particular importance when the driver and/or occupants of the vehicle are communicating via the microphone/audio system in the vehicle via radio transmission to a receiver remote from the vehicle. Such remote receivers can provide a variety of services that are selected by and/or are dependent on clear and audible voice input received from the vehicular audio system. For example, a concierge-type service can be provided, whereby a restaurant, address, etc., listing can be provided. Also, the vehicle occupant may be voice communicating with an automatic computer based service, such as airline reservation services and the like, where the driver must select menu items through verbal input of an alphanumeric (typically a number) input. Lack of clarity and/or volume and/or the presence of noise may lead to an incorrect selection at the remote receiving party, unbeknownst to the vehicle based driver and/ or occupant. The indicator of the present invention thus provides to the driver and/or occupants of the vehicle an indication that verbal input to the audio system in the vehicle is being adequately correctly received by the audio system in the vehicle and/or, more preferably, is being adequately received after transmission to the remote receiver. Thus, by having an adequately clear reception by the remote receiver external to the vehicle confirmed back to the vehicular audio system, and by having this indicated to the driver and/or other occupants by the indicator of the present invention, protection is provided against inadequate communication, even caused by interference during the transmission from the vehicle to the remote receiver or receiving party.

According to another aspect of the present invention, an accessory module comprises at least one microphone for receiving audio signals from within a cabin of a vehicle, at least one indicator, and a housing for mounting the microphone. The vehicle includes a windshield, an interior rearview mirror mounted to an interior surface of the windshield, and a headliner extending along an upper edge of the windshield. The indicator is operable to communicate a receiving status of the audio signals to a user of the audio system. The housing for the microphone is preferably mountable between the headliner and the rearview mirror. The microphone and indicator of the accessory module (and any other accessory housed within the accessory module) are electronically connectable to a vehicle wiring within the headliner. Preferably, accessories, such as the microphone and the indicator, are detachably connectable to the vehicle wiring, such as by a plug and socket connector (for example, a multi-pin electrical plug and socket connector system), so that the module can be optionally installed to the vehicle with ease. This is particularly advantageous in circumstances when the interior mirror is a non-electrical mirror, such as a base prismatic mirror.

In one form, the rearview mirror is electronically connected to the vehicle wiring harness. Preferably, the accessory module further includes a wire cover to encase a wire harness between the rearview mirror and the accessory module. More preferably, the microphone, indicator and mirror are connectable with the vehicle wiring in the headliner.

According to another aspect of the present invention, an accessory module for a vehicle comprises at least one microphone for receiving audio signals from within a cabin of the vehicle, a microphone housing for mounting the microphone, and an interior rearview mirror assembly. The vehicle includes a windshield and a headliner extending along an upper, inner edge of the windshield. The microphone is electronically connectable to a vehicle wiring harness within the headliner. The microphone housing is mountable to the windshield adjacent to the headliner. The mirror assembly includes a mirror wire harness and a mirror housing. The mirror wire harness is electronically connectable to the vehicle wiring harness in the headliner. An indicator may be provided for the audio system to communicate an audio signal receiving status to a user of the audio system.

In one form, the mirror assembly further includes a mounting button for mounting the mirror assembly to an interior surface of the windshield. The mounting button may be interconnected to the microphone housing via a wire cover extending between the microphone housing and the mounting button and at least partially encasing the mirror wire harness and/or the mounting button itself. The indicator may be mounted on at least one of the accessory module, the mirror housing, a module/pod attached to the mounting button, and the mounting button.

In another form, the microphone housing includes a mirror mounting arm which extends generally downwardly therefrom. The mirror housing is pivotally interconnected to a lower end of the mounting arm. The mirror wire harness is at least partially encased within the mounting arm.

Accordingly, the present invention provides an indicator for a microphone or accessory module for use with an audio system, such as a hands-free cellular telephone, audio recording device, emergency communication device or the like. The indicator provides a signal to a user of the audio system which communicates whether a human vocal audio signal being received by the audio system is above a threshold level and/or is at least substantially discriminated from other audible noise, so that the vocal signal to non-vocal audible signals received by the audio system from the microphone exceeds a predetermined threshold ratio. Preferably, this ratio is at least 2:1. Most preferably, this ratio is at least 10:1. The microphone and indicator may be mounted in the vehicle cabin, and preferably is mounted as part of the interior rearview mirror system. The accessory module may contain the microphone and/or the indicator and is preferably mounted above the mirror between the mirror and the headliner of the vehicle, which provides a fixed location of the microphone for maintaining proper orientation of the microphone with respect to the vehicle interior. The indicator may be mounted at the accessory module, a rearview mirror housing, behind the mirror reflector in the housing so as to illuminate through the reflector, a rearview mirror mounting portion or a headliner of the vehicle. Because the accessory module is a separate component from the mirror and headliner, additional mirror or headliner console components for mounting the microphone are not required. The present invention facilitates fewer parts in the assembly plant since the headliner and mirror assembly may be the same part regardless of whether the audio or communication device associated with the invention is to be installed within the vehicle. Furthermore, because the accessory module does not require special headliners or mirrors, the accessory module may be easily installed as an aftermarket device.

According to another aspect of the present invention, an interior rearview mirror assembly is provided including at least one microphone coupled with a digital sound processor, most preferably supplied as a module comprising at least one microphone that provides an output to a microprocessor-based control that performs digital sound processing on the microphone output in order to enhance the human vocal signal received and in order to reduce any non-vocal signal components from ambient noise in the vehicle cabin.

In one form, an interior rearview mirror digital sound processing system suitable for use in a vehicle equipped with an audio system is provided comprising an interior rearview mirror assembly. The interior mirror assembly includes at least one microphone capable of producing an audio output in response to detection of vocal input. The vocal input signal has vehicle cabin noise (such as from road noise, HVAC noise, wind noise, windshield noise, traffic noise engine noise etc) superimposed thereon. The interior mirror assembly further includes a digital sound processor. The digital sound processor receives a signal indicative of the microphone audio output; and the digital signal processor processes the signal indicative of the microphone audio output and provides an output vocal signal with substantially reduced vehicle cabin noise These and other objects, advantages, purposes and features of this invention will become apparent upon review of the following specification in conjunction with the drawings.

DESCRIPTION OF THE PREFERRED EMBODIMENTS

Figure 1:
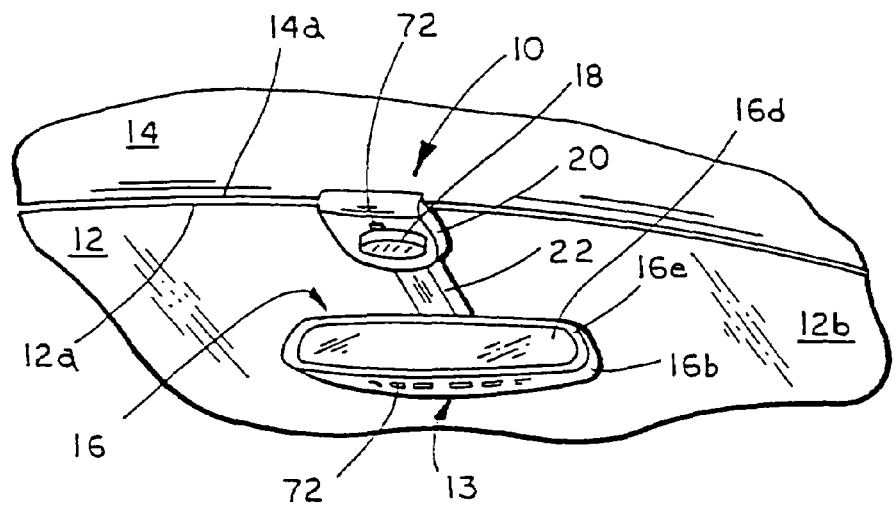
FIG. 1 is a perspective view of the microphone module of the present invention.

Referring now specifically to the drawings, and the illustrative embodiments depicted therein, an accessory or microphone module 10 is mounted adjacent to a vehicle windshield 12, as shown in FIG. 1. Microphone module 10 may be implemented in the vehicle in association with an audio system, such as a cellular telephone, a recording device, such as a dictation system, an emergency communication device, such as the ONSTAR™ system commercially available in certain General Motors vehicles, or any other audio device which may include a microphone or audio receiving device. Preferably, the manually actuated buttons to operate the ONSTAR™ system are mounted at a movable housing 16b of an interior rear view mirror assembly 16, such as is shown generally at 13 in FIG. 1. The vehicle includes a headliner 14, which at least partially covers the ceiling of an interior passenger compartment of the vehicle and has a forward edge 14a which interfaces with an upper edge 12a of windshield 12. An interior rearview mirror assembly 16 may be mounted to an interior surface 12b of windshield 12, typically at a position spaced downwardly from upper edge 12a and the position of module 10. Microphone module 10 includes at least one microphone 18 which is fixedly secured within a microphone housing 20 and is directed toward an area generally defined by the location of a head of a typical driver of the vehicle. An indicator 72 is included for providing an audio signal receiving status message to a user of the audio system. The message conveys to the user whether the audio signal was adequately received by the microphone 18 and/or a receiving party of the audio system which is remote from the vehicle. The audio system of the vehicle, such as the ONSTAR™ vehicle system, communicates with the receiving party, typically via a satellite transmission of radio frequencies or via a terrestrial radio frequency transmission system involving multiple receivers, transmitters, and/or repeaters. Microphone module 10 may further include a wire cover 22 which extends downwardly between housing 20 and mirror assembly 16 to encase or cover a mirror wire harness 24, which may be included in mirror assembly 16 to provide power or control signals to components or accessories which may be mounted within or associated with mirror assembly 16.

Figure 2:
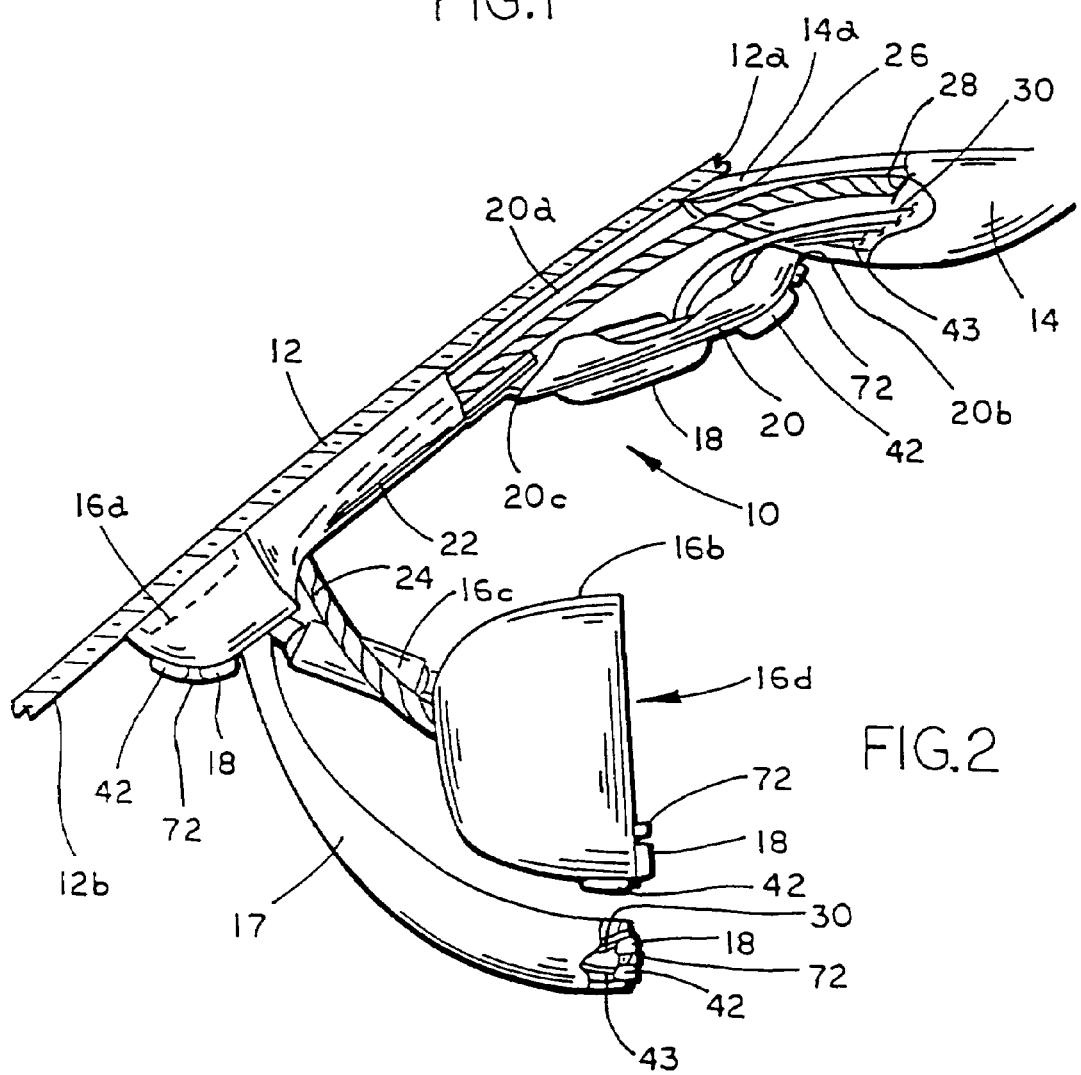
FIG. 2 is a side elevation shown partially in section of the microphone module in FIG. 1.
Figure 3:
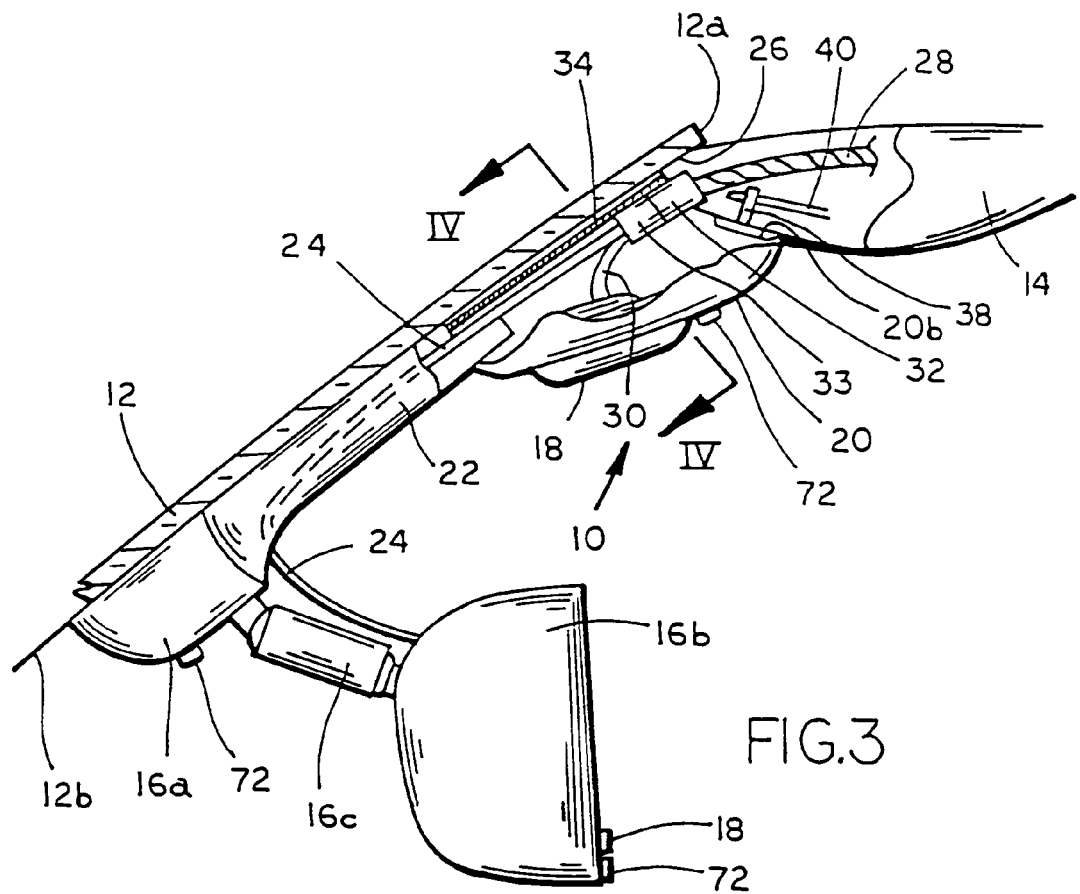
FIG. 3 is a similar side elevation as that in FIG. 2, showing an alternate electrical connection and mounting bracket for the microphone module.

As shown in FIG. 2, mirror assembly 16 may include a conventional mounting button 16a and a mirror housing 16b supporting a prismatic, electro-optic or electrochromic reflective element 16d. Mounting button 16a may be adhesively secured to interior surface 12b of windshield 12 at a location substantially below forward edge 14a of headliner 14 and upper edge 12a of windshield 12, as is known in the art. Mirror housing 16b is pivotally mounted to mounting button 16a via an arm 16c, which is pivotally interconnected to button 16a or housing 16b, or both, such that housing 16b is pivotally adjustable about mounting arm 16c. Alternately, mounting arm 16c terminates at the vehicle headliner to pivotally mount the mirror assembly to the headliner of the vehicle. Mirror housing 16b encases a reflector 16d (FIG. 7) for reflecting an image of a scene generally rearwardly of the vehicle to the driver (and with the mirror housing being adjustable by the driver), and a bezel 16e which retains reflector 16d in housing 16b, as is well known in the art. Mirror wire harness 24 extends generally upwardly from mirror housing 16b to headliner 14 for electrical connection with a vehicle wiring harness 28 (FIG. 3). Mirror wire harness 24 provides electrical power and/or control signals to the mirror assembly 16 or various mirror mounted accessories within assembly 16, such as power for electro-optic/electrochromic mirrors, interior lights (such as map lights in the mirror housing), and displays such as for compass headings, temperatures, passenger airbag status, or the like.

Headliner 14 extends along upper edge 12a of windshield 12 and may be a plastic trim panel to secure a fabric ceiling cover and provide an aesthetically pleasing finish between the windshield and the fabric ceiling cover of the vehicle. Alternately, headliner 14 may be a forward portion of the fabric cover or a ceiling console. Headliner 14 may further include other trim or headliner console components (not shown), for storing various articles, such as sunglasses, garage door openers or the like or for housing other components or accessories associated with the vehicle.

Indicator 72 is operable with microphone 18 and the audio system to provide a signal to a user of the audio system, typically the driver of the vehicle, which conveys a level of reception of the user's vocal signal by the audio system. Indicator 72 may be used with microphone 18 as part of an interior rearview mirror system. The interior rearview mirror system may comprise a reflective element positioned in a mirror housing 16b. The housing 16b may be pivotally mounted to a mounting arm 16c which terminates at a mirror mount, such as at a mounting button or the like secured to the windshield and/or a mount at a header of the vehicle. The mirror system may include pods, gondolas, modules, or the like, attached to one or more of the housing, arm and mount. The mirror system may further include a wire cover and/or any microphone and/or accessory module. The mirror system may further include indicator 72, microphone 18 and/or other vehicle accessories mounted at, on or in the mirror assembly 16, such as at housing 16b, mounting arm 16c, mounting button 16a, or a pod or module attached thereto. Indicator 72 and microphone 18 and/or other accessories may otherwise be mounted at accessory module 10, without affecting the scope of the present invention.

Preferably, indicator 72 provides a receiving status signal in response to a reception of the audio signal by the audio system reaching a threshold level of clarity and/or volume. The signal may communicate the reception status of the microphone, so as to alert the driver to speak up or speak more clearly. Preferably, the indicator signal indicates when a human voice signal is being adequately received by the microphone. Alternately, or in addition to the reception status of the microphone, the indicator signal may communicate the reception status of a receiving party of the communication which is remote from the vehicle, such as another party's cellular phone or the ONSTAR™ receiving station. For example, the indicator may be connected to a control (not shown) of the audio system and may receive a signal from the receiving party external to the vehicle, such as from the receiving station of the ONSTAR™ system, which indicates whether the message sent by the user in the vehicle was adequately received by the ONSTAR™ system.

Preferably, indicator 72 is operable with a control (not shown) which discriminates between vocal signals and other audible inputs received by microphone 18 which are non-vocal. The indicator 72 thus provides a signal that an adequately high voice signal to audible noise discrimination ratio is occurring. The indicator may indicate when an audible signal received by the audio system is above a threshold level. Preferably, the indicator indicates when the audible signal is a vocal signal which is discriminated from other audible noise, such as HVAC noise, wind noise, music and the like, so the vocal signal to non-vocal signal received by the audio system is at or above a predetermined threshold ratio. Preferably, this ratio is at least approximately 2:1. Most preferably, this ratio is at least approximately 10:1.

Preferably, indicator 72 provides a visual indication of the quality of the reception of the audio signals. Preferably, indicator 72 is a solid state light emitter such as a light emitting diode (LED), is a phosphorescent element or display or is a tell-tale, such as an LED backlit icon. However, indicator 72 may be an incandescent bulb, an incandescent backlit tell-tale, or any other illumination source, without affecting the scope of the present invention. The indicator may then display when the microphone and/or audio system is receiving and distinguishing or discriminating a good signal. For example, if the signal is adequately received, indicator 72 may be activated to provide an illumination signal to the driver, and if the signal is poor or is breaking up between the vehicle and the receiving end of the communication, the indicator may be deactivated or flashed to alert the user. Indicator 72 may also be operable as another signaling device when the audio system is not in use or is over ridden when it is desired to display the status of another vehicle function. For example, indicator 72 may provide a security system status indication (discussed below) or a status of other operable systems or controls within the vehicle. Preferably, indicator 72 would provide a status indication of a system or control which is not typically activated when the audio system would be in use, such as the security system, which is typically activated when a driver leaves the vehicle. Preferably, the intensity of indicator 72 is modulated dependent upon the vehicle cabin ambient light level. Thus, for example, the indicator intensity is decreased during night time driving conditions to better suit the then darkened cabin lighting environment. This can be achieved such as by use of a photo-detector (such as the ambient and/or glare photodetector commonly used in electrochromic (EC)

automatic dimming interior rearview mirror assemblies) or may be tied to the vehicle lighting instrument panel system so that the intensity of indicator 72 dims in tandem with the dimming of, for example, the instrument panel displays.

Figure 9:
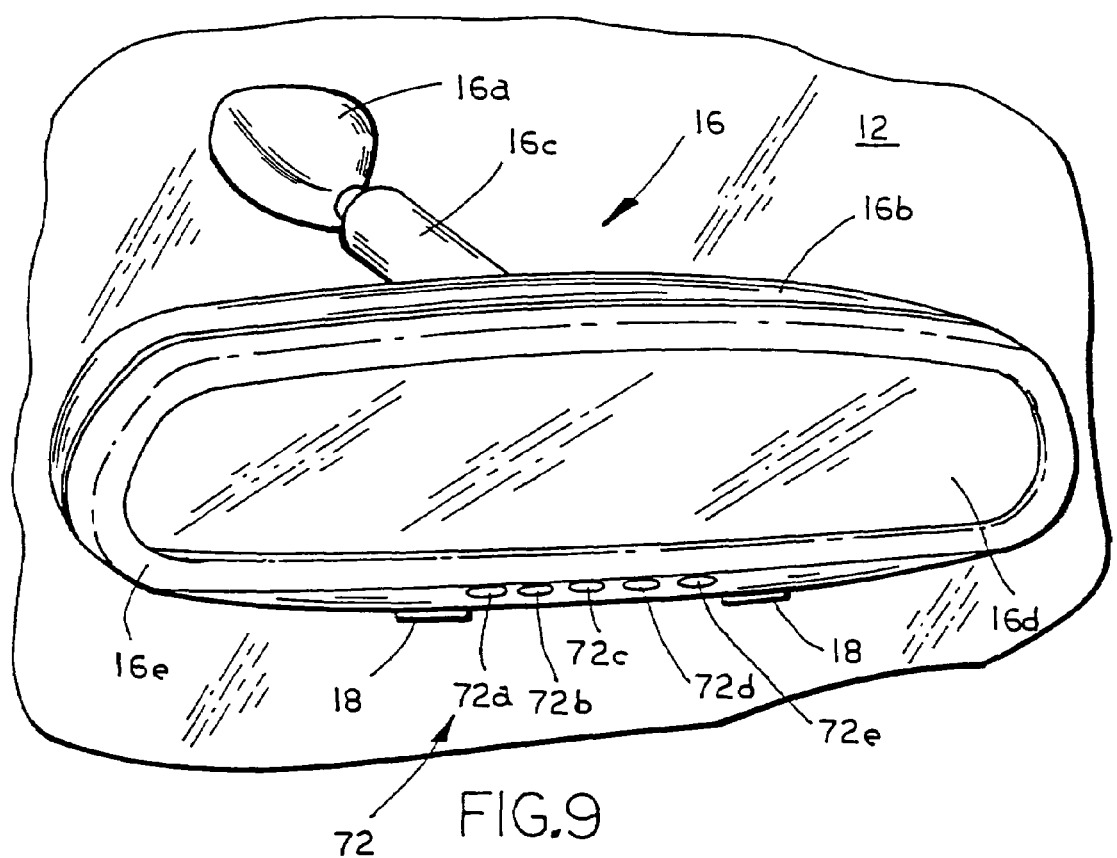
FIG. 9 is a perspective view of an interior rearview mirror incorporating the present invention.

It is further envisioned that the indicator 72 may include multiple light emitters 72a, 72b, 72c, 72d, and 72e, as shown in FIG. 9. The number of indicators illuminated would then provide an estimate to the user of the strength and/or quality of the audio signal being communicated. For example, if the signal is very strong or clear, all of the multiple light emitters may be illuminated, while if the signal is weak, some number of emitters less than all will be activated, depending on the strength or quality of the signal. Each emitter would be activated in response to a different threshold level of signal quality being received by the audio system.

Although indicator 72 is preferably one or more illumination sources, indicator 72 may alternately be an audible source, such as a loudspeaker or the like, which may provide an audio signal to the user of the audio system to alert the user when the signal quality drops below a threshold level of acceptability. The audible source may provide an audible tone when the signal quality deteriorates, or may include a voice chip, such as a digital recording of a human voice message contained on a semi-conductor chip, to tell the user of the system to speak up, repeat the message or speak more clearly. It is further envisioned that the indicator 72 may provide an alphanumeric display, which may provide a printed message or digital rating of signal quality to the user of the audio system. Each message displayed or number in a rating scale would correspond to a different threshold level of signal quality, such as clarity and/or volume.

Indicator 72 and microphone 18 may be connected to a control (not shown) which monitors the audio signals received by microphone 18. The control may be operable to discriminate between different audio signals, such as between voice signals and non-voice signals, such as music, fan noise, and wind noise. The control may be further operable to provide a message via indicator 72 to alert the user of the audio system to turn down a radio in the vehicle, turn down or off a blower for a heating, ventilation and air conditioning system, roll up the windows of the vehicle, and/or adjust other sources of non-voice signals within the vehicle, such as turn signals or the like, in response to a detection of one or more of these non-voice signals. Alternately, or in addition thereto, the control may further be operable to automatically adjust the volume of the radio, the fan speed of the blower, the window setting and the like in response to such a detection. The control and indicator may also alert the user of the system if multiple voices are being received simultaneously, such as via conversations between passengers in the vehicle or conversations on the radio, which may detract from the clarity of the signal being received by the microphone.

The audio system and microphone may further include a learning mode, whereby the audio system/microphone combination learns the vocal characteristics of a particular driver or occupant, so that the ratio of vocal signals to non-vocal noise signals received by the system can be enhanced. The learning mode may be operable in a memory system, such as is known in the automotive art, whereby a group of drivers and/or occupants, typically one, two or three individuals, may be recognizable by the audio system. The learning mode may be operable to recognize a particular individual's voice via the operator selecting the learning mode and speaking a brief message to the microphone. The audio system then receives the individual's voice message and repeats the message back to the individual via a speaker or alphanumeric display. This process is continued until the message is accurately recognized and repeated by the audio system. The recognized vocal characteristics may then be stored to memory for future use by the individual. A security feature for the audio system and/or any vehicle accessory and/or the vehicle itself can be provided via voice recognition.

Preferably, indicator 72 is mounted at, in or on the mirror housing 16b, either at, within or on or adjacent the bezel 16e. This is preferred because the driver of the vehicle is typically the person using the audio system, and this location provides optimal visibility of the indicator to the driver, since the mirror housing is adjusted to be directed toward the driver. Indicator 72 may otherwise be mounted in the housing 16b and behind the mirror reflector 16d, so as to illuminate through the reflector. However, as shown in the Figures, indicator 72 may alternately be positioned at accessory module 10, mirror mounting portion 16a, or headliner 14, and may be positioned at any other location where the indicator is visible to the user of the audio system, without affecting the scope of the present invention. It is further envisioned that indicator 72 may be implemented with a microphone 18 which is mounted at mirror housing 16b or mirror mounting portion 16a, as shown in FIGS. 2, 3, 7 and 9, in applications without an accessory module. As shown in FIG. 2, microphone 18 and indicator 72 may alternately be positioned at a pod 17, which may be attached to mounting portion 16a, arm 16c, or housing 16b of mirror assembly 16. A speaker 42 may also be included with microphone 18 and indicator 72, in applications either with or without accessory module.

By providing an indication of the receiving status of vocal signals received by the audio system, the present invention significantly reduces the possibility that a message will not be received clearly, correctly, and/or accurately by the receiving party. The vehicle based user of the audio system is alerted immediately if the microphone is not adequately receiving and/or is not adequately/correctly/accurately interpreting the message and/or if the other party to the communication is not adequately receiving the message. Accordingly, the user may speak up or speak more clearly, or adjust the volume of other noises or conversations within the vehicle to correct the reception concerns. The user may also re-send the message if it was not properly being received by the other party. The present invention is especially useful when the other party is an automatic or computer based voice recognition system. The user in the vehicle will be alerted by indicator 72 that the message sent may not have been properly received by the voice system and may then re-send the message or try again later in order to ensure that the message is properly received.

The audio system is connected to indicator 72 and microphone 18. Microphone 18 may share its audio receiving function with a plurality of audio systems, such as a cellular phone, the ONSTAR™ system, a recording device, such as a digital recording device, and/or other systems which receive audio signals. Preferably, a digital recording device is incorporated in the interior rearview mirror system, such as within the interior rearview mirror housing. One or more functions may be selected at one time. For example, if the microphone is being used with a cellular phone function, it may also be used to provide an input to the recording device. The function of microphone may be manually selected by controls, such as switches or buttons, within the cabin of the vehicle or may be voice selected and controlled. Microphone 18 and the audio system may also be voice activated to further ease the operation of the audio system. This is preferred because it may be difficult to manually activate and control the audio system while driving the vehicle. Also, voice activation of the system substantially precludes the likelihood of leaving the system on when it is not in use, which would drain the vehicle's battery over time, since the audio system would be automatically deactivated when voices are not received by the microphone. Microphone 18 may also function as a receiver for one or more other vehicular functions and controls, such as voice activated headlamps, alarm systems, radios, cruise control, windows, cellular phones, message recorders, pagers, back up aids, windshield wipers, rain sensors and the like.

Optionally, the interior rearview mirror system can include a display of the status of the vehicle tire inflation (such status can be provided by monitoring the ABS braking system and/or by individual tire pressure sensors in the individual vehicle tires). The interior rearview mirror system may also include a PSIR (passenger side inflatable restraint) display for indicating the status of a PSIR. The tire inflation display, the PSIR display or other displays indicating the status of vehicular accessories or functions may be provided at the interior rearview mirror assembly, such as at, on or in the mirror housing, mounting arm, mounting button, or pod/module attached to the housing, arm or mounting button.

The interior rearview mirror system may further include a camera and/or display, for providing an image of an area not viewable by the rearview mirror when it is adjusted for driving conditions. Preferably, the camera may be directed toward the rear seats of the vehicle so as to function as a child minder. The portion of the vehicle being viewed by the camera (preferably a CCD and, most preferably, a solid state CMOS camera) is preferably illuminated. Preferably, the video camera selected, such as a CMOS camera, is sensitive in the near-infrared region and so has night vision capability. Most preferably, the illumination is provided (preferably, mounted at and illuminating from the mounting site of the camera itself) by one or more near-infrared illumination sources, such as light emitting diodes which emit efficiently in the near-infrared portion (wavelengths from approximately 0.75 microns to about 1.5 microns), but which do not emit efficiently in the visible portion (wavelengths below approximately 0.75 microns) of the electromagnetic spectrum. Therefore, the interior cabin of the vehicle may be illuminated with radiation in a range which the camera is sensitive to, such that the system can form a clear image of the area on the display, while the cabin is not illuminated with visible light which, at night, may be sufficient to cause glare or discomfort to the driver and/or passengers in the illuminated area.

Although the mirror system and/or vehicle is described above as including one or more of a camera, pager system, cellular phone and the like, it is further envisioned that these accessories and others may be portable or dockable with a connecting port of the vehicle or mirror system. An individual or driver of the vehicle may use the personal pager, cellular phone, video camera, electronic personal organizers, such as a PILOT unit or the like, remote from the vehicle, such as at home, in a business office, or the like, and may then dock, plug in or otherwise connect the device to the connecting port for use within the vehicle. The devices may be dockable at the interior rearview mirror assembly, or may be dockable elsewhere in the vehicle, without affecting the scope of the present invention. The dockable device may, when docked into the vehicle, may personalize the controls and functions of the vehicle to suit that individual driver. Thus, features such as seat position, radio station selection, mirror field of view orientation, climate control, and other similar vehicle functions may be set to suit the individual preferences, or restrictions (such as a restriction from use of a cellular phone, or the like) for that particular driver. Such dockable portable devices may be especially useful to provide a security function and/or for tracking, logging, accounting for individual users, such as would be desirable for fleet operators, car rental operators, school bus fleet operators, and the like.

Microphone 18 may be mounted to accessory module 10, which includes wire cover 22 (FIGS. 1 and 2) which extends between a lower edge 20c of housing 20 and mounting button 16a of mirror 16. Mirror harness 24 is encased within wire cover 22 to retain harness 24 and provide a finished appearance to the electrical connection of mirror 16 to vehicle wiring harness 28. Preferably, wire cover 22 is telescopingly extendable and retractable to adapt the length to different mounting locations of mounting button 16a relative to headliner 14 on various vehicles. As best shown in FIG. 2, wire cover 22 may extend or retract by sliding upwardly or downwardly within housing 20. This facilitates implementation of microphone module 10 in various vehicles and further facilitates the aftermarket installation of module 10 in vehicles having a button-mounted interior rearview mirror.

Microphone module 10 is preferably secured to interior surface 12b of windshield 12 at an interface junction 26 between forward edge 14a of headliner 14 and interior surface 12a of windshield 12. However, it is envisioned that microphone module 10 may be mounted in other locations. Housing 20 of microphone module 10 is preferably formed with a substantially flat windshield mounting surface 20a and a curved, concave headliner surface 20b, such that housing 20 mounts to windshield 12 along mounting surface 20a, while headliner surface 20b substantially uniformly engages headliner 14 to provide a flush, finished transition between microphone module 10 and headliner 14. Preferably, housing 20 is adhesively secured to interior surface 12b of windshield 12, such as by bonding, pressuring sensitive adhesives, anaerobic adhesives, double faced tape, or the like. However, microphone module 10 may optionally be mechanically secured to an intermediate mounting bracket adhered to the windshield, or may be connected to the headliner itself, as discussed below, without affecting the scope of the present invention. Microphone module 10 is preferably a plastic molded part, which facilitates forming the part in various shapes to match the headliner/windshield interface and to further facilitate providing the part in different colors to match optional interior colors of the vehicles.

Figure 7:
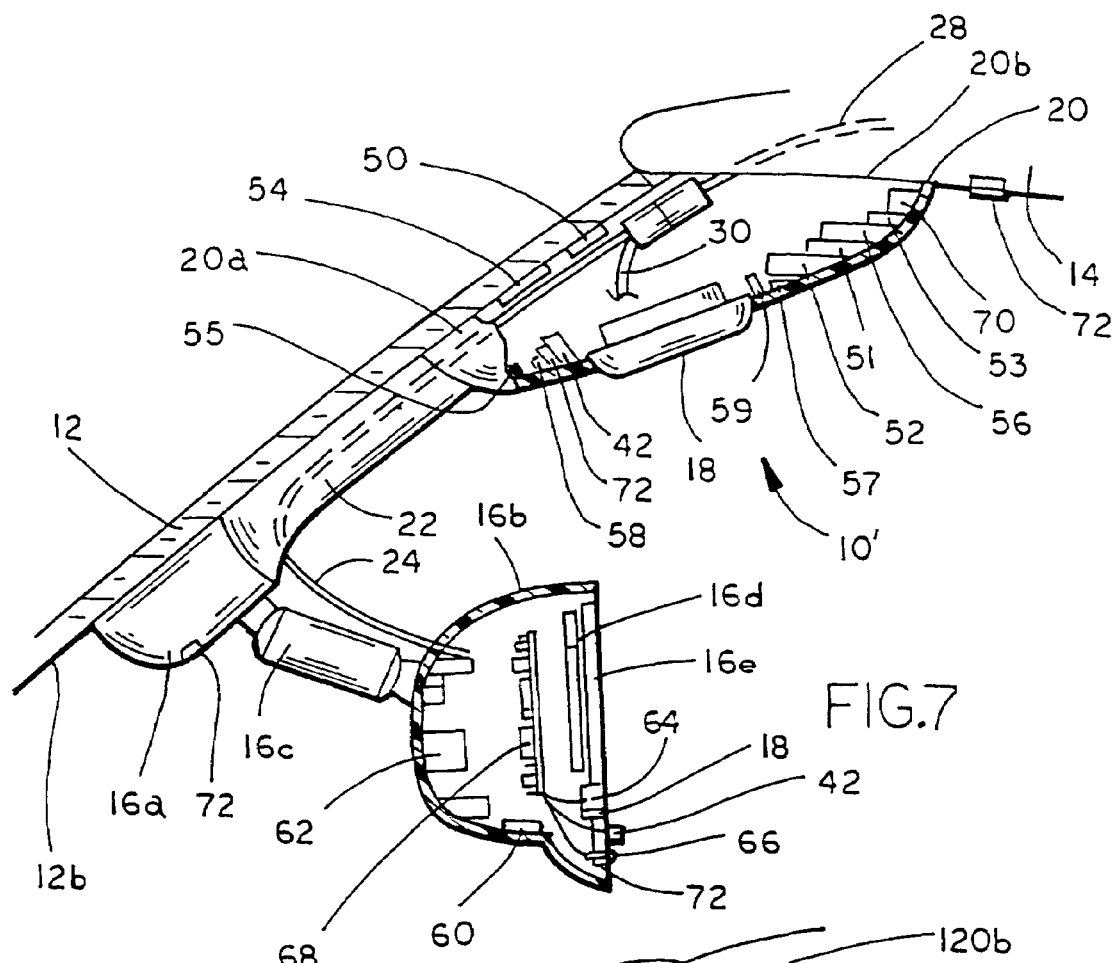
FIG. 7 is a side elevation shown partially in section of a microphone module and mirror housing having various electrical and/or electronic components therein.

Mirror harness 24 may connect directly to vehicle wiring 28 while an accessory wiring harness 30 may separately connect to the vehicle wiring to provide power and/or control signals to the accessories within accessory module 10. Alternately, mirror harness 24 may connect to module 10, which may then be connectable to vehicle wiring 28, as shown in FIGS. 3 and 7. Because microphone module 10 may be a separate module from the headliner and the mirror assembly, and because module 10 is preferably connected to the vehicle wiring independent of wires from the interior rear view mirror assembly to the vehicle wiring, microphone module 10 may be easily removed or accessed for serviceability or replacement without having to remove or replace the mirror assembly. This is a significant advantage over the prior art because if the microphone is damaged, the more expensive components, such as the mirror or headliner console, do not have to be replaced in order to repair or replace the microphone.

Microphone module 10 may be mounted to windshield 12 such that microphone 18 is directed downwardly and rearwardly toward the driver's seat of the vehicle to optimally receive audio signals therefrom. Preferably, microphone 18 is a directional or polar microphone, which limits the audio signal received to signals within the area toward which the microphone is directed. Such microphones are known in the art and are commercially available as an AKG 400 Series or a 501T Series microphone from A.K.G. Acoustics/GMBH in Vienna, Austria. These microphones are operable to receive audio signals from within the targeted area, while substantially reducing or limiting the signals received from outside that area. By mounting microphone 18 within housing 20 and directing microphone 18 downward and rearward toward a typical location of a driver's head, the audio signal detected by microphone 18 will be dominated by a voice signal from the driver of the vehicle and will substantially limit noise signals originating from other sources, such as the engine, road, wind, HVAC, radio, turn signals and the like. Because microphone 18 may be fixedly mounted within housing 20, microphone 18 may be optimally directed toward the area of interest, and will not be adjusted or misdirected when the mirror is adjusted for a different driver of the vehicle.

Alternately, multiple microphones may be implemented within microphone module 10 to receive various signals from different directions. As is known in the audio art, RMF techniques may be implemented to digitize individual outputs from the multiple microphones and integrate the outputs to establish which outputs are the loudest and which have the presence of human audible signals verses noise. The signals which have the greatest presence of human audible signals may then be selected over the signals of the other microphones, thereby providing a voice signal to the communication device.

Microphone module 10 further includes a microphone wire harness 30 (FIG. 3), which extends from microphone 18 through headliner surface 20b of housing 20 and into headliner 14. Microphone 18 is preferably interconnectable to the vehicle harness by microphone harness 30 in a conventional manner. Preferably, microphone harness 30 comprises a pair of wires for microphone 18. Clearly, however, if multiple microphones are implemented in microphone module 10, multiple wires (not shown) will correspondingly be required. Furthermore, if indicator 72 is included in module 10, additional wiring 30a (FIG. 4) will also be required.

As shown in FIG. 2, the audio system may further include a loud speaker 42 for providing an audible signal to the driver and passengers of the vehicle. Speaker 42 may be mounted to housing 20 and includes a wiring harness 43 for electrical connection to the vehicle wiring 28, similar to microphone 18. Speaker 42 may be a conventional diaphragm speaker, piezo-electric speaker, such as a piezo-electric ceramic speaker, or the like. Most preferably, speaker 42 is a piezo-electric ceramic moldable speaker. Additional speakers may be mounted within the accessory module 10 or in a pod 17 attached to the mirror mounting bracket 16a of the interior rear view mirror assembly.

It is further envisioned that the audio system may include multiple microphones and/or speakers positioned at different locations within the vehicle to supplement one another in order to optimally receive and project the audio signals from and to the desired areas within the vehicle. For example, as shown in FIG. 2, one or more microphones 18 and/or speakers 42 may be positioned in module 10, as well as in mirror housing 16b, in mounting button 16a, and/or within a pod 17, which may be mounted to mirror assembly 16 and extends downwardly beneath mirror housing 16b. Clearly, pod 17 may alternately be positioned above or to either side of mirror housing 16b, without affecting the scope of the present invention. The microphone 18 and speaker 42 may access and/or share the electronic circuitry of an electro-optic or electrochromic mirror. By providing one or more microphones and speakers within the vehicle, the overall effectiveness of the audio system may be improved, since signals not optimally directed toward the microphone within the module, may be better received by the microphone in the pod, mirror housing, or button. It is further envisioned that one or more indicators 72 may be positioned at one or more locations within the vehicle, such as at the module 10, mirror housing 16b, mounting button 16a, and/or pod 17, as shown in FIG. 2. Microphone 18 and/or speaker 42 may also be positioned at the mirror or pod assemblies in conjunction with microphones or speakers in a module 10 or in applications where the vehicle does not include a microphone module.

Although shown as having a microphone 18 within a module 10, the present invention includes implementation of a microphone 18 and indicator 72 in various locations within the cabin of the vehicle. As shown in FIG. 9, microphone 18 and indicator 72 may be mounted to mirror housing 16b. Alternately, microphone 18 and/or indicator 72 may be mounted to the mirror mounting button 16a or at a pod or other mounting device positioned in the vicinity of the mirror assembly 16. If the audio system includes a speaker and/or a recording device, the speaker and/or recording device may be mounted to the mirror assembly or pod, or may be positioned elsewhere within the cabin of the vehicle, either in the vicinity of the microphone and/or the indicator or remote therefrom.

Referring again to FIG. 3, microphone module 10 may alternately connect to the vehicle wiring harness 28 via electrical connectors 32 and 33. For example, a socket 33 may be provided in housing 20 of microphone module 10, such that vehicle wiring harness 28 may include a corresponding male connector, such as a conventional twelve pin connector, which mates with socket 33. Microphone harness 30 may then extend from socket 33 to microphone 18, while remaining within housing 20. Similarly, mirror harness 24 may extend from socket 33 downwardly through housing 20 and wire cover 22 to mirror assembly 16. By connecting both the mirror harness 24 and microphone harness 30 to the vehicle harness 28 with connectors 32 and 33, microphone module 10 further facilitates simplified installation of mirror assembly 16 within the vehicle.

Figure 4:
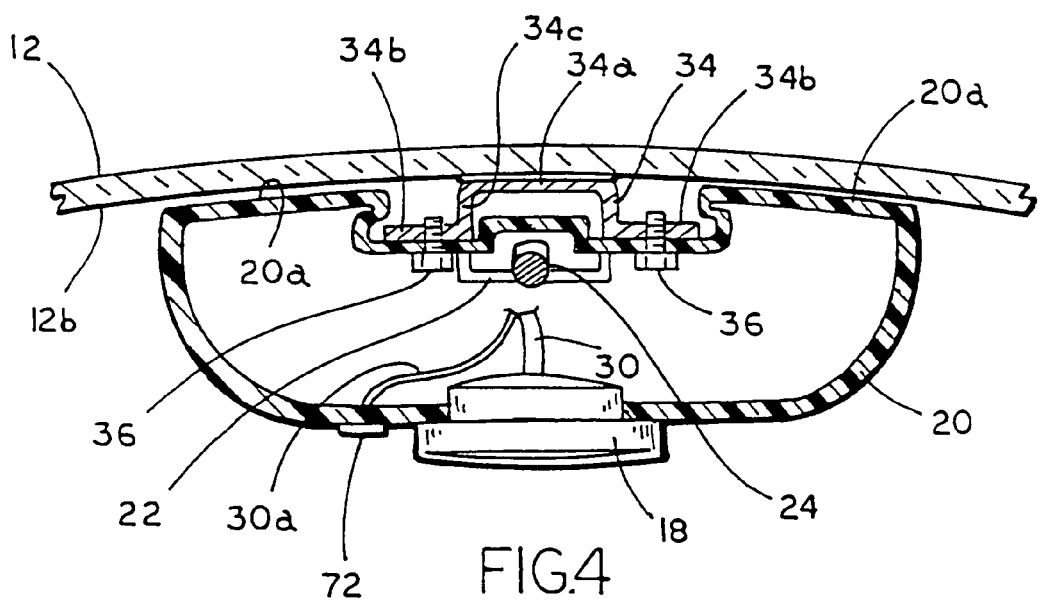
FIG. 4 is a sectional plan view of the microphone module taken along the line IV-IV in FIG. 3.

As shown in FIGS. 3 and 4, microphone module 10 may be mechanically secured to window 12 and/or headliner 14. For example, a bracket 34 may be bonded or otherwise adhesively secured to interior surface 12d of windshield 12. Window surface 20a of housing 20 may then be correspondingly formed with bracket 34 to engage the bracket for removable mounting of microphone module 10 to windshield 12. As best shown in FIG. 4, bracket 34 may include a windshield mounting surface 34a and a pair of mounting flanges 34b which are offset from the position of mounting surface 34a and extend laterally outwardly from a pair of sidewalls 34c, which extend downwardly and rearwardly from mounting portion 34a. Windshield surface 20a of housing 20 may then be correspondingly formed to slidably engage mounting flanges 34b of bracket 34, such that housing 20 is slidable upwardly along bracket 34 until headliner surface 20b interfaces with headliner 14. At that point, one or more mounting pins or fasteners 36 may be inserted through housing 20 and mounting flanges 34b to substantially secure the components together. Alternatively, or in addition to fasteners 36, a headliner fastener 38 (FIG. 3) may extend through headliner surface 20b of housing 20 and engage a bracket 40 within headliner 14, thereby substantially securing housing 20 to both windshield 12 and headliner 14. Mounting fasteners 36 and 38 may be threaded fasteners or push-pin or snap fit type fasteners, to substantially secure housing 20 to the respective brackets 34 and 40. It is further envisioned that the mounting bracket and microphone housing may be correspondingly formed to press-fit together or snap or otherwise lock together as the microphone housing is moved to the appropriate mounting location relative to the bracket. Clearly, other mounting brackets and/or fasteners may be implemented to substantially secure microphone module 10 relative to windshield 12 or headliner 14, without affecting the scope of the present invention.

Figure 5:
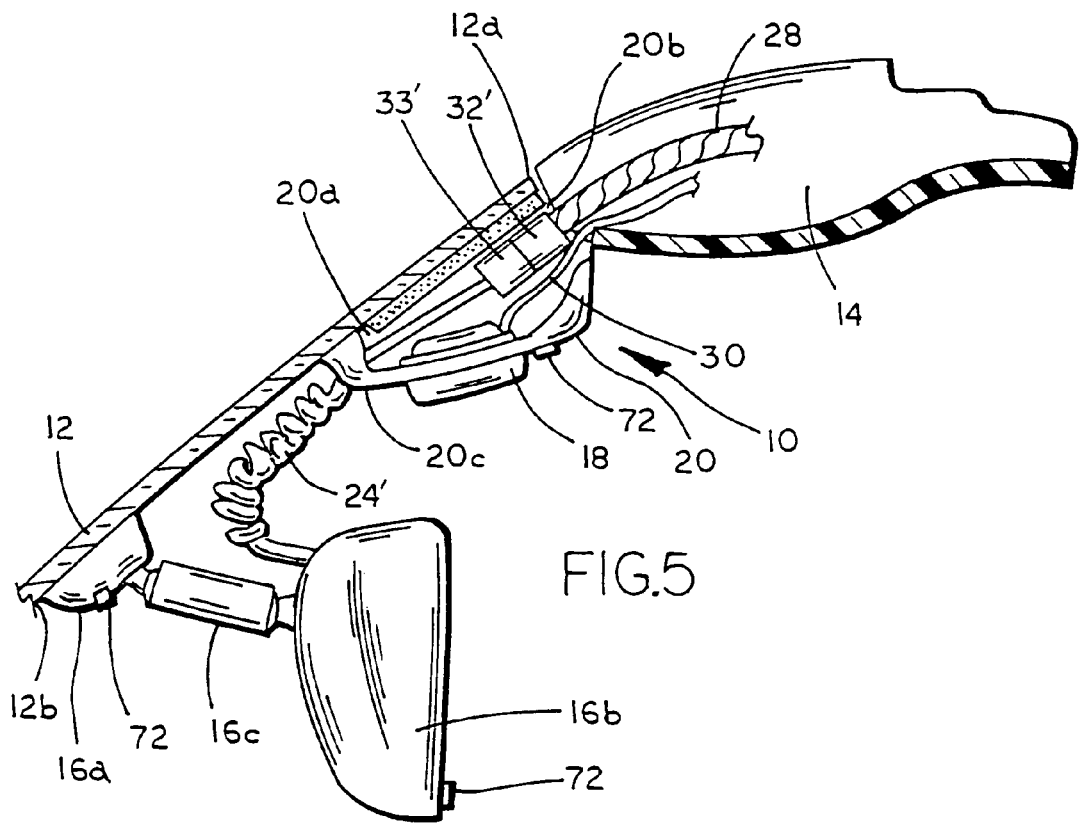
FIG. 5 is a similar side elevation as that in FIG. 2, showing a microphone module without a wire cover but including a self-coiling wire harness.

Referring now to FIG. 5, microphone module 10 may be implemented without a wire cover. The mirror wiring harness may extend freely downwardly from microphone housing 20 to mirror housing 16b or may be adhered or otherwise secured or guided along interior surface 12b of windshield 12 and further along arm 16c to mirror housing 16b. Alternately, as shown in FIG. 5, a mirror harness 24' may be implemented to provide an aesthetically pleasing spirally-coiled cord, similar to a conventional telephone cord, which extends downwardly from lower end 20c of housing 20 and curves rearwardly toward housing 16b of mirror assembly 16. Mirror harness 24' may be electronically connectable with vehicle wiring harness 28 via conventional electrical connectors 32' and 33', while microphone harness 30 is electronically connected with the vehicle wiring harness separately, as discussed above with reference to FIG. 2. Clearly, however, mirror harness 24' and microphone harness 30 may be connectable to vehicle wiring harness 28 by any other conventional means, without affecting the scope of the present invention. As discussed above with reference to FIGS. 2 and 3, housing 20 may be bonded to, adhesively secured or mechanically fastened to interior surface 12b of windshield 12 and/or to headliner 14.

Although specific embodiments of the microphone module of the present invention are shown in FIGS. 2 through 5 and discussed above, clearly the scope of the present invention includes other means of mounting the microphone module and of covering or guiding the mirror harness between the microphone module and the mirror. For example, the microphone module may be mounted to the windshield between mounting button 16a and headliner 14 and have wire covers or the like extending from both upper and lower ends of the module to cover wires between the headliner and the module and further between the module and the mirror assembly. Alternatively, the microphone module may be mounted above and adjacent to the mirror mounting button 16a and include a wire cover which extends upwardly therefrom to substantially encase the wires extending from the module to the headliner for connection with the vehicle wiring harness. It is further envisioned that the microphone module may be part of a plastic wire cover extending upwardly from the interior rear view mirror assembly toward the headliner. The wiring harnesses associated with the mirror assembly, the microphone and the indicator may be routed and connected with the vehicle wiring harness by any known means without affecting the scope of the present invention. The microphone, indicator and mirror assembly may be implemented as a single component, which requires fewer assembly plant installation processes, thereby reducing the costs associated with the vehicle manufacture. It is further envisioned that microphone 18 and indicator 72 may be mounted anywhere within the cabin of the vehicle without an accessory module. Preferably, both are positioned forwardly of the driver of the vehicle to optimally receive a voice signal from the driver and to be easily viewed by the driver while looking forwardly. Preferably, the microphone and indicator are mounted at the rearview mirror housing 16b, the mirror button 16a, the headliner 14, and/or a pod attached to the mirror assembly (such as a pod attached to the mirror button mount of the interior rearview mirror assembly), windshield or headliner.

Figure 8:
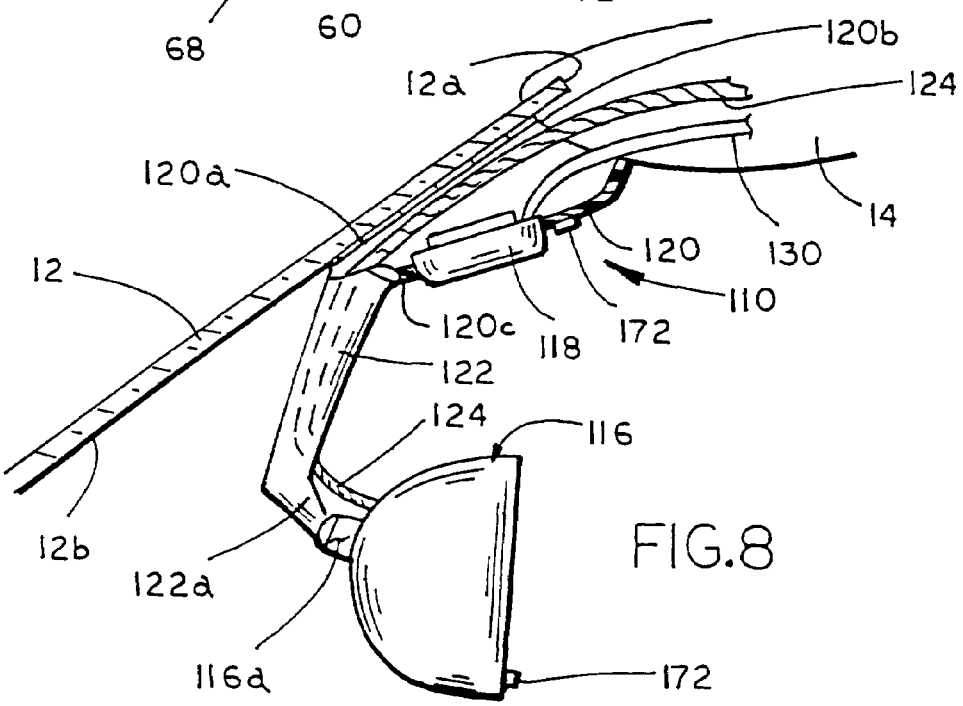
FIG. 8 is a similar side elevation as that in FIG. 2 of an alternate embodiment of the present invention, having a rearview mirror mounted to an arm extending downwardly from the microphone module.

Although shown and described above as being implemented with a button mounted interior rearview mirror assembly, an alternate embodiment of the present invention may incorporate a mirror assembly 116 with a microphone module 110, as shown in FIG. 8. Microphone module 110 preferably includes a microphone 118 and a microphone housing 120, which are substantially similar to microphone 18 and housing 20, discussed above with respect to microphone module 10. However, microphone module 110 further includes a mirror mounting arm 122, which extends generally downwardly from a lower portion 120c of housing 120. Mirror assembly 116 is pivotally mounted to a lower end 122a of arm 122 via a conventional ball and socket connection 116a. A mirror wiring harness 124 extends from mirror assembly 116 upwardly through arm 122 and further through housing 120 and into header 14 of the vehicle for electrical connection with the vehicle wiring harness. A microphone harness 130 may also electronically connect microphone 118 with the vehicle wiring harness, as discussed above with respect to microphone harness 30. Microphone module 110 and mirror assembly 116 may be electronically connected to the vehicle wiring harness by any known means, without affecting the scope of the present invention. An indicator 172 may be included at module 110 and/or at mirror housing 116 to provide an audio signal receiving status to the driver of the vehicle or user of the audio system, similar to indicator 72, discussed above. Similar to microphone module 10, a windshield surface 120a of housing 120 may be adhesively or mechanically secured along an interior surface 12b of windshield 12.

Figure 6:
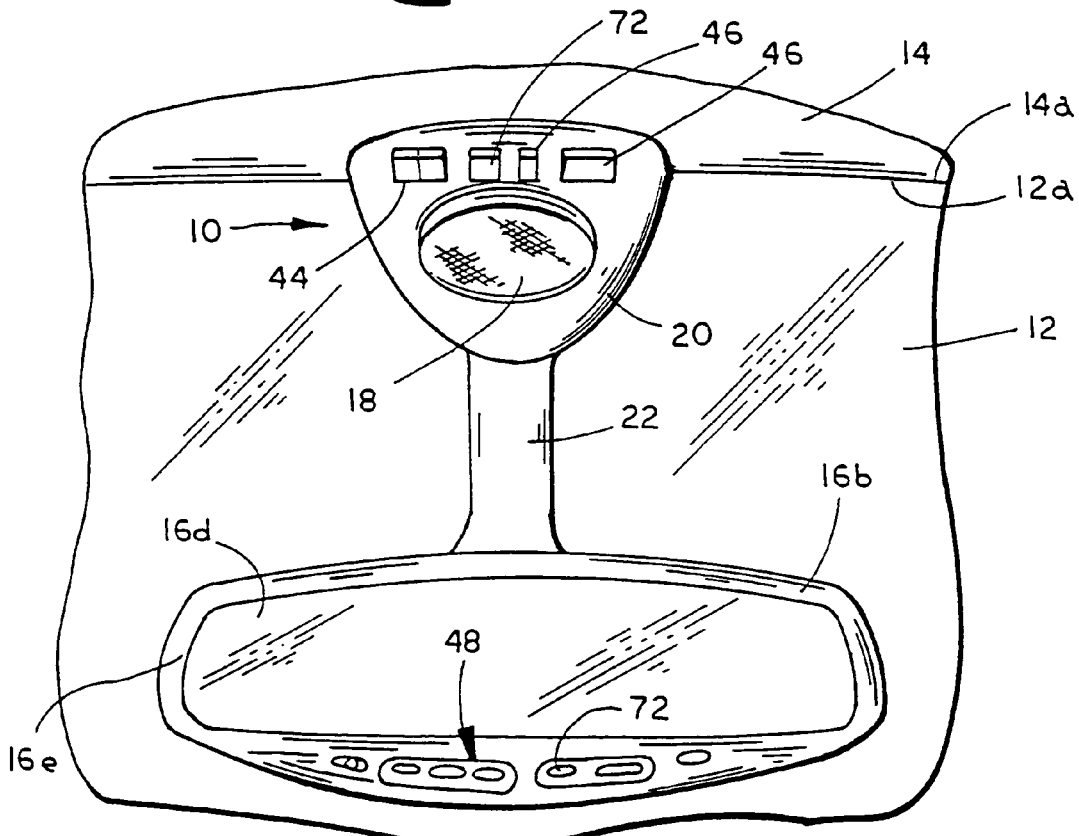
FIG. 6 is an elevation looking forwardly in a vehicle cabin of a microphone module and mirror housing having controls mounted thereon.

As shown in FIG. 6, microphone module 10 may further include manual controls for the audio or communication device associated with microphone 18, such as buttons 44 for activating and/or adjusting the communication device. Microphone module 10 may further include other manual controls 46 for activating or adjusting other accessories or devices within the vehicle, such as interior or exterior lights, or for selecting a function for microphone 18, such as a cellular phone versus an emergency communication device or recording device. Mirror housing 16b may also include controls, buttons or switches, shown generally at 48, for selectively activating, deactivating or adjusting one or more accessories associated with the vehicle. For example, controls 48 may activate map reading lights on mirror housing 16b, temperature displays, compass heading displays or the like, which may be displayed on a portion of mirror housing 16b and are thus easily visible to the driver of the vehicle. Alternatively, however, controls 46 and 48 on microphone module 10 and mirror housing 16b, respectively, may control accessories or lights which are located on or within the vehicle and yet are remote from microphone module 10 and mirror 16.

Referring now to FIG. 7, an accessory module 10' may further include multiple accessories, components or devices associated with various control systems of the vehicle and connected with a vehicle control or the vehicle wiring harness. For example, accessory module 10' may include a microphone 18, an indicator 72, a loudspeaker 42, a Global Positioning System (GPS) antenna 50, a motion sensor 52, a rain sensor 54, a video device or camera 56, an interior light 58, an automatic toll booth transducer 59, a security system status indicator 70, a compass and/or compass sensor 51, a temperature display and/or temperature sensor 53, a tire pressure indicator display 55, a seat occupancy detection antenna and/or transducer 57, and/or any other devices, components or circuitry which may be useful to mount in accessory module 10'. Preferably, camera 56 is a pixilated imaging array sensor, such as a CMOS imaging array or the like, a description of which is disclosed in commonly assigned U.S. Pat. No. 5,670,935, issued to Schofield et al., the disclosure of which is hereby incorporated herein by reference. The module 10' may provide a location for these devices which is highly visible and eases user interface by the driver or passengers of the vehicle. Furthermore, mirror housing 16*b* may also include electrical devices and electronic components, such as other microphones 18, indicators 72 and loudspeakers 42, map reading lights 60, compass 62, display 64, trip computer 66, or other components or devices associated with the vehicle. Mirror harness 24 may provide power and/or control signals to these components or devices and may interconnect with the control circuitry of the devices and of an electrochromic mirror function control circuitry 68 for electronically adjusting the reflectivity of reflector 16*d* within mirror housing 16*b*. Display 64 may display vehicle status or information displays, such as compass headings, interior or exterior temperatures, clock display, fuel level display, air bag status display, telephone dial information display, or other status displays of various components or devices associated with the vehicle. Information displayed in display 64 may be selectively displayed by an operator via controls 48 (FIG. 6), or may be cyclically displayed or may be displayed when there is a change in status of one of the devices.

It is envisioned that accessory module 10' may further include multiple electrical and/or electronic components, such as those described in commonly assigned, co-pending U.S. patent applications, Ser. No. 08/918,772, filed Aug. 25, 1997 by Deline et al., and Ser. No. 09/244,726, filed Feb. 5, 1999 by Deline et al., the disclosures of which are hereby incorporated herein by reference. The mirror and/or the microphone module and/or any electronic feature located at, on or in mirror assembly 16 may communicate with these or other devices or components within the vehicle as part of a Car Area Network (CAN) or multiplex system, such as is disclosed in commonly assigned U.S. Pat. No. 5,798,575, issued to O'Farrell et al., PCT International Application published Sep. 25, 1997 under International Publication No. WO 97/34780, by Fletcher et al., PCT International Application No. PCT/IE98/00001, filed Jan. 9, 1998 by John P. Drummond et al. and published Jul. 16, 1998 under International Publication Number WO 98/30415, the disclosures of which are hereby incorporated herein by reference, a Local Interconnect Network (LIN), or similar communications protocols, which may support the control of mechatronic nodes in automotive distributed control applications. Mechatronic nodes suitable to use in mirror assembly 16 are available from STMicroelectronics of Grenoble, France and Motorola of Chicago, Ill. A mechatronic node or unit typically comprises a microprocessor-based controller that receives data and/or digital control signals from a vehicle bus or network. The mechatronic unit is located, for example, in an exterior mirror assembly such as located in the case of the housing of the assembly where the exterior mirror reflector is accommodated or in the bracket of the housing of the assembly. In response to data and/or control signals received from the vehicle data bus to which it interfaces, the mechatronic module controls a plurality of accessories local to its location in the vehicle. For example, a mechatronic unit located in the exterior mirror assembly can receive data and/or control signals from a control located elsewhere on the vehicle bus or network (such as from a door module controller located in a door panel or from an interior mirror assembly or from a central vehicle computer etc), and acting on the control commands received from the vehicle data bus, the mechatronic unit can operate a variety of accessories such as an exterior mirror reflector positioning actuator, an exterior mirror assembly-located security light, a turn signal indicator, an exterior mirror reflector defrosting heater, an exterior rearview mirror assembly powerfold mechanism, an exterior electrochromic or similar electro-optical variable reflectance reflective element etc. For example, a mechatronic unit located at or in an exterior mirror assembly (or a mechatronic unit located adjacent or close to an exterior mirror assembly such as in a door module controller in a door panel) can receive a control signal from a vehicle data bus that, when received and acted on by the mechatronic unit, causes the reflectivity of the variable reflectance mirror reflector to be set at the partial reflectance level indicated by the control signal received from the bus (such control signal being typically put onto the vehicle bus as an output from an automatic dimming interior electrochromic mirror assembly such as disclosed in the PCT International Application published Sep. 25, 1997 under International Publication No. WO 97/34780, by Fletcher et al., and PCT International Application No. PCT/IE98/00001, filed Jan. 9, 1998 by John P. Drummond et al. and published Jul. 16, 1998 under International Publication Number WO 98/30415, the entire disclosures of which are hereby incorporated by reference herein). In this manner, a variable control signal carried to the exterior mirror assembly via the vehicle bus is received at the mechatronic unit and, in response, the mechatronic unit supplies a drive signal (typically a DC voltage or an pulse-width modulated voltage drive) to the exterior rearview electrochromic element. A variable voltage power supply is either part of the mechatronic unit or is locally connected to the mechatronic unit located at the exterior mirror assembly. Upon receipt of the variable control signal from the vehicle data bus, the mechatronic unit outputs a variable drive voltage that is applied to the exterior electrochromic mirror element (that could be a flat electrochromic mirror element or a convex electrochromic mirror element or an aspheric, multiradius electrochromic mirror element) that varies the reflectivity of the exterior electro-optic mirror element as indicated by the control signal received from the vehicle bus. As the control voltage received from the data bus varies, the reflectivity of the exterior electrochromic mirror element varies under the control of the control signal sent via the bus (and typically the variable control signal originates from an interior automatic dimming electrochromic mirror assembly) to the exterior mirror assembly. Since an electrochromic mirror element typically consumes in the range of 50 milliamps to 150 milliamps or more steady-state current (a.k.a. leakage current) when dimmed (and with peak initial dimming currents of 0.25 amps to 2 amps or more), the mechatronic unit at or in the exterior mirror assembly (or any local power drive circuit the mechatronic unit output to/controls) is configured to be rated to deliver the current needed to power the electrochromic mirror element it controls (or to power any other power/current consuming accessory the mechatronic module controls).

Figure 15:
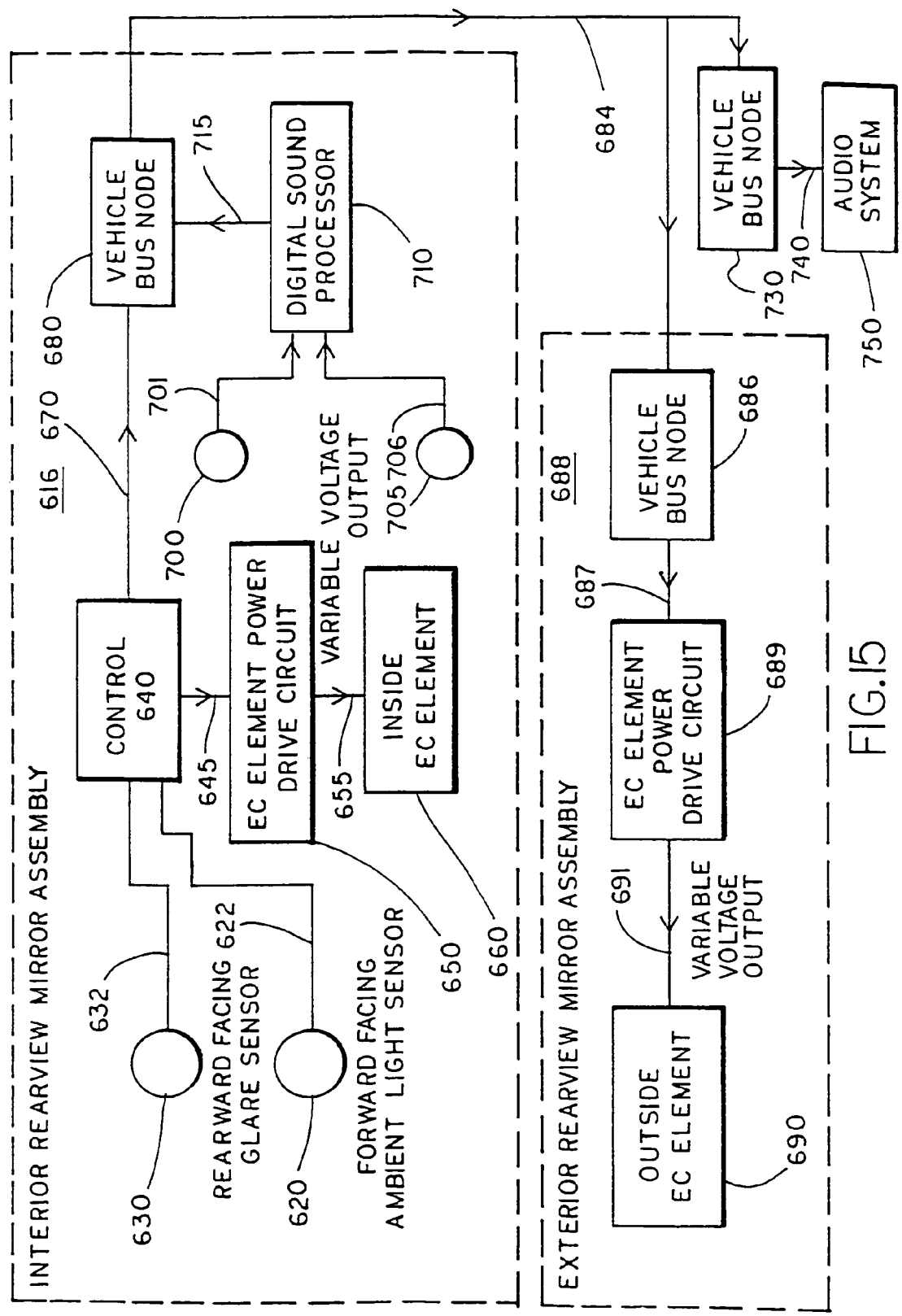
FIG. 15 is a schematic diagram of an interior mirror assembly linked to an exterior mirror assembly incorporating the present invention.

The vocal signature output of a digital sound processor mounted at, on or in mirror assembly 16 can be provided to a vehicular local interactive network such as the Digital DNA™ local interactive network available form Motorola. The vocal signature signal can serially pass along the network at speeds up to 20 kilobits/second, or more, and can be received and acted on by an audio system (such as an ONSTAR™ system or an in-vehicle computer or a cellular phone or a voice-command controller for a vehicle function). By linking various vehicular. accessories (such as a mirror-located sound processing system) to a non-mirror located audio system on a CAN or LIN or CAN/LIN network (that can comprise a single master/multiple slave control architecture), wiring complexity in the vehicle can be reduced. Such use of a vehicular bus system is particularly advantageous when mirror assembly 16 has multiple features such as a memory feature, such as disclosed in U.S. patent application Ser. No. 09/448,690, entitled "Memory Mirror System For Vehicles" to Mark. E. Kramer et al. of Donnelly Corporation, filed Nov. 24, 1999, the entire disclosure of which is hereby incorporated by reference herein, and when reflective element 16d comprises an electrochromic element whose reflectivity is variable in accordance with the level of glare detected by automatic glare detecting circuitry, that also is included in mirror housing 16b, and when interior mirror assembly 16 is linked to at least one, commonly two, exterior sideview mirrors mounted to the opposing sides of the vehicle exterior body, such as is disclosed in U.S. patent application Ser. No. 09/375,315 entitled "Vehicle Mirror Digital Network and Dynamically Interactive Mirror System" to Desmond J. O'Farrell et al. of Donnelly Corporation, filed Aug. 16, 1999, the entire disclosure of which is hereby incorporated by reference herein. When mirror assembly 16 comprises an automatic dimming electrochromic mirror assembly, and when at least one of the exterior side view mirrors mounted on the vehicle comprises an electrochromic mirror element as its reflective element, it is common in the art to have the glare detecting circuitry positioned in the interior mirror assembly also provide a control signal to the exterior mirror-mounted electrochromic mirror element so that, in tandem with the interior mirror-mounted glare detecting circuit providing a voltage to the interior mirror electrochromic mirror element to dim to a particular partial reflectance level in response to a level of glare detected by a glare-sensing photodetector mounted in housing 16b, a similar voltage is provided to the exterior electrochromic mirror element to cause it to also dim to a partial reflectance level. The exterior mirror electrochromic mirror element dimming is slaved off the interior electrochromic mirror. Conventionally, this is achieved by running a wire between the interior mirror automatic dimming circuitry and the exterior mirror-mounted electrochromic sideview mirror element. By connecting with a wire (or pair of wires), the voltage and current needed to dim the exterior sideview electrochromic mirror element is provided by the circuitry mounted in the interior mirror assembly. This arrangement has the disadvantage of requiring the automaker to connect the interior and exterior mirrors by dedicated wires that carry the voltage/current needed to dim the exterior electrochromic mirror(s). An improvement on this can be achieved using an exterior mirror located control such as is disclosed in U.S. patent application Ser. No. 09/448,690, entitled "Memory Mirror System For Vehicles" to Mark. E. Kramer et al. of Donnelly Corporation, filed Nov. 24, 1999, the entire disclosure of which is hereby incorporated by reference herein. A suitable mechatronic unit for use in a vehicular mirror assembly is available from STMicroelctronics of Grenoble, France in the mechatronic power mirror UD13 controller including a ST 7 controller core and memory. In such a CAN/LIN or similar vehicular multiplexed system, and as described in FIG. 15, interior rearview mirror assembly 616 includes a forward facing ambient light sensor 620 and a rearward facing glare light sensor 630. Their respective outputs, 622 and 632, are provided as an input to glare detection control 640. Glare detection control 640, preferably, is a digital controller including a microprocessor that processes inputs 622, 632 to determine whether a glaring condition exists, and if so, its intensity. Glare detection control 640 outputs a signal 645 to interior mirror electrochromic element power driver 650. Controlled by input signal 645 (which may be an analog signal or a digital signal), interior electrochromic mirror element power driver 650 provides a drive voltage input 655 (and any necessary current) to power inside electrochromic element 660. Drive voltage 655 is preferably variable in the 0 to 2.5 volt range, more preferably in the 0 to 1.5 volt range, most preferably in the 0 to 1.3 volt range. Preferably, drive voltage 655 is unipolar, although a bipolar drive voltage may be used when inside electrochromic element 660 colors and bleaches bipolarly. Depending on the difference between glaring and ambient light levels as detected by light sensors 620 and 630, the voltage level of drive voltage 655 varies in order to dim the reflectivity of inside electrochromic element 660 to a partial reflectance level that reduces glare to the driver of the vehicle. Glare detection control 640 also outputs a signal 670 that is input to vehicle bus node 680. Signal 670 (which may be an analog or a digital signal) is indicative of the partial reflectance level desired for outside electrochromic mirror element 690 that is located in a sideview mirror assembly 688 such as a driver-side exterior mirror assembly attached to the vehicle outer body such as near a front door window. Signal 670 is carried via vehicle bus 684 to exterior mirror vehicle bus node 686 which, in turn, provides an input 687 to exterior electrochromic mirror element power driver 689. Exterior electrochromic mirror element power driver 689 provides a drive voltage 691 (and any necessary current) to outside electrochromic mirror element 690. Drive voltage 691 is preferably variable in the 0 to 2.5 volt range, more preferably in the 0 to 1.5 volt range, most preferably in the 0 to 1.3 volt range. Preferably, drive voltage 691 is unipolar, although a bipolar drive voltage may be used when exterior electrochromic mirror element 690 colors and bleaches bipolarly. Thus, an exterior electrochromic mirror dimming signal is generated at the interior mirror assembly and sent (preferably digitally and serially) to the exterior mirror assembly via a vehicle bus where, upon receipt at the exterior mirror assembly, the electrochromic dimming control signal is locally converted to the voltage required by the exterior electrochromic element to achieve the desired partial reflectance state, and this voltage is applied to the exterior mirror electrochromic mirror by a drive-circuit (of sufficient power and current capacity to power the exterior electrochromic mirror element) housed at or adjacent to the exterior mirror assembly that can provide the current needed to dim the electrochromic element. Note that bus 684 may connect with and/or pass through and/or link to other busses or nodes (such as a door control module) in its transmission of signal 670 to the exterior mirror assembly. Also, although it is preferable that interior mirror vehicle bus node 680 be located, as shown in FIG. 15, at, on or within the interior rearview mirror assembly (such as in the mirror housing), it can be located elsewhere in the vehicle. Also, although it is preferable that exterior mirror vehicle bus node 686 be located, as shown in FIG. 15, at, on or within the exterior rearview mirror assembly (such as in the mirror housing), it can be located elsewhere in the vehicle (such as in a door panel as part of a door module or as part of a seat control module). Two exterior mirror assemblies (one on the driver-side of the vehicle and the other on the opposing passenger-side of the vehicle) can be linked by a vehicle bus, such as vehicle bus 684, to a single interior automatic dimming electrochromic mirror assembly. In such a two electrochromic sideview mirror assembly configuration, the individual output signal from vehicle bus node 680 to each of the two exterior mirror assemblies can be the same for both or can be different for one exterior mirror electrochromic mirror element compared to the signal for the other. Thus for example, in a three-mirror configuration where all three of the inside and two outside mirrors comprise variable reflectance electrochromic(EC) mirror elements, all three EC elements can dim to substantially the same partial reflectance level or two or all three of the set can dim to different partial reflectance levels, dependent on signals carried via the vehicle bus to the respective exterior electrochromic mirror elements (and on the signal provided to the interior EC element). For example, by placing a mechatronic module at an automatic dimming interior EC assembly and at least one exterior EC mirror assembly (and preferably at two exterior EC mirror assemblies) and by linking the assemblies via a vehicle data bus as shown in FIG. 15, the partial reflectivity of the outside EC element(s) and of the inside EC element can be set to compensate for any light absorption by vehicle windows, such as is disclosed in U.S. patent application Ser. No. 09/415,346 entitled "A Light-Responsive Control Such As An Electro-Optic Rearview Mirror System That Is Adaptive To Vehicle Configuration" to Schofield et al. of Donnelly Corporation, filed Oct. 8, 1999, the entire disclosure of which is hereby incorporated by reference herein. Also, independent dimming of individual automotive mirrors in a two-mirror and a three-mirror configuration, such as is disclosed in U.S. Pat. Nos. 5,550,677; 5,877,897; and 5,760,962 (the entire disclosures of which are hereby incorporated by reference herein) is facilitated by placing a mechatronic module at an automatic dimming interior EC assembly and at least one exterior EC mirror assembly (and preferably at two exterior EC mirror assemblies) and by linking the assemblies via a vehicle data bus as shown in FIG. 15.

Interior mirror assembly 616 also includes microphones 700, 705 (located such as in mirror housing) that provide inputs 701, 706 to digital sound processor 710. Digital sound processor 710 provides a vocal signature input 715 (that is indicative of speech detected by microphones 700,705 with an enhanced vocal to non-vocal noise ratio) to vehicle bus node 680. Vehicle bus node 680 provides this signal to vehicle bus 684 which in turn provides it to vehicle bus node 730 which provides an output signal 740 to audio system 750 (which may, for example, be an emergency communication system such as is included in the ONSTAR™ system or it may be a cellular phone or it may be a voice-command controller or it may be a dictation system) that is located in the vehicle at a location spaced from and distant from the interior mirror assembly. Note that bus 684 may be a wired link such as a single, double or three wire cable or a coaxial cable, or it may be an optical link such as a fibre-optic link conveying data via modulated light or it may be a wireless link with data being transmitted between nodes by radio-frequency, infrared or similar transmission.

Accessory module 10' may also include an illumination source 70 for a vehicle security system, such as an intrusion detection system, vehicle alarm system, vehicle antitheft system, or the like. The illumination source may be an incandescent source or a nonincandescent source. Preferably, illumination source 70 is a nonincandescent, solid state source such as a light emitting diode (LED), an electroluminescent device or the like. The illumination source 70 is operable to blink or flash intermittently when the system is armed. Typically, such systems flash the illumination source rapidly at first for up to approximately 30 seconds (or longer) after arming of the system, and then intermittently flash the illumination source for a continuous period while the system is activated (for example, once every one to two seconds), thereby alerting people within the vehicle that the security system is activated. Optionally, the security system indicator may be provided by indicator 72. Indicator 72 may provide an audio signal receiving status when the audio system is in use, and then provide a security system status signal when the audio system is deactivated and/or the security system is armed.

It is further envisioned that the illumination source for the vehicle security system may be included in a separate module or pod which may be mounted to the microphone or accessory module the mirror assembly, or the vehicle headliner. The illumination source module may be substantially similar to the microphone or accessory module discussed above and may clip or otherwise be mounted to the microphone module. For example, the illumination source module may snap into a mounting aperture in the microphone module or may be adhesively mounted to a side wall of the microphone housing. Alternately, the security system activation status source module may be mounted to the mirror assembly, such as to the mounting button, arm or mirror housing. The illumination source module may then be positioned below, above, or to either side of the mirror housing to facilitate viewing of the illumination source by passengers within the vehicle. The illumination source module may otherwise be mounted to the wire cover of the microphone module such that it is visible above the mirror housing. If the vehicle includes a header mounted mirror assembly, it is further envisioned that the illumination source module may be mounted to, or included as part of, the header mirror mounting bracketry or other mounting device.

By providing a vehicle security system illumination source module as a separate component, greater flexibility is achieved by the vehicle manufacturers. The separate security system module avoids the additional expenses required to tool two different mirror cases for vehicles with or without a security system. The optional pod or module with the illumination source may be simply installed as a vehicle option, or as an aftermarket device. Similar to the microphone and accessory modules discussed above, the illumination source module for the security system may further include other components, devices, controls or displays associated with the security system or other systems within the vehicle. It is further envisioned that other pods or modules which include one or more various components or devices associated with other systems or devices of the vehicle may be implemented to facilitate easy installation of the components of the systems either in the assembly plant or as aftermarket devices.

Interior rearview mirror assembly 16 may house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays such as shown in U.S. Pat. No. 5,530,240 or in U.S. pending application Ser. No. 09/244,726, filed Feb. 5, 1999, and copending application Ser. No. 09/448,700, entitled "REARVIEW MIRROR ASSEMBLY WITH ADDED FEATURE MODULAR DISPLAY" filed Nov. 24, 1999, by Timothy Skiver et al., blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,17, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. patent applications Ser. No. 09/361,814, filed Jul. 27, 1999, Ser. No. 09/396,179, filed Sep. 14, 1999, and Ser. No. 09/199,907, filed Nov. 25, 1998, speakers, a compass, such as disclosed in U.S. Pat. No. 5,924, 212, seat occupancy detector, a trip computer, a wireless vehicle-based telematic/telecommunications system such as an ONSTAR™ System or the like, with all of the referenced patents and applications commonly assigned to Donnelly Corporation, the disclosures of which are herein incorporated by reference in their entireties.

Figure 10:
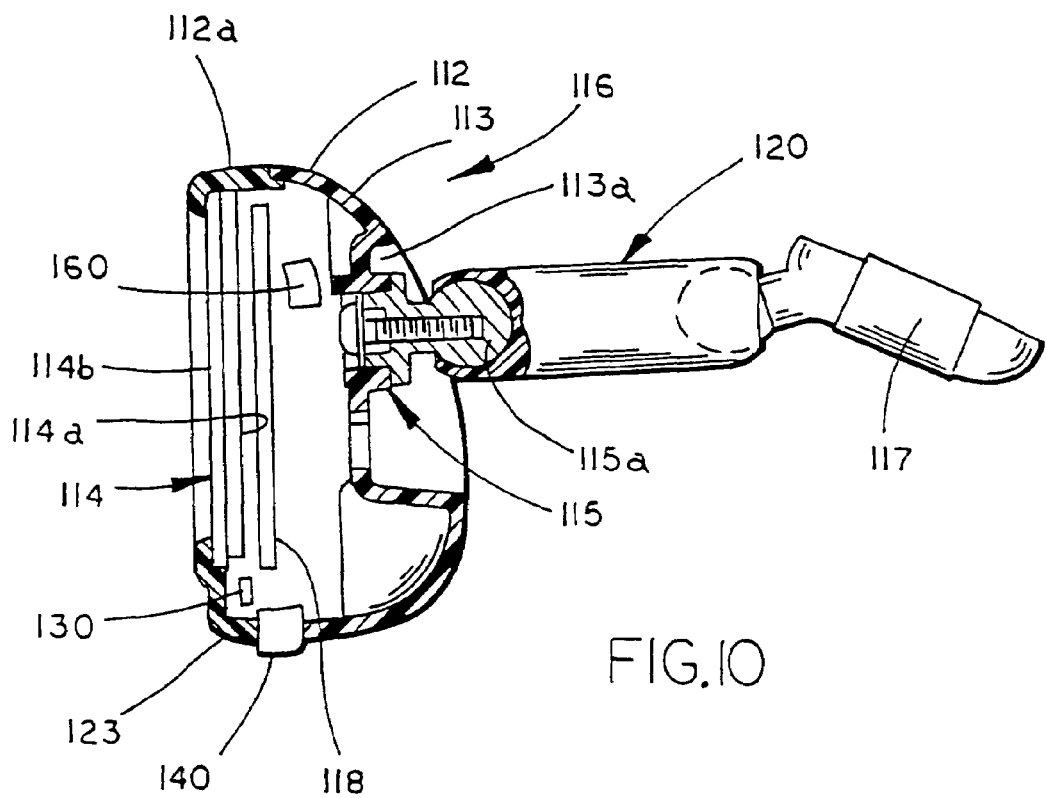
FIG. 10 is a side elevation of an interior rearview mirror assembly shown partially in section and incorporating the present invention.

Referring to FIG. 10, mirror assembly 116 preferably includes a circuit board 118, which includes electronic or electrical circuitry for actuating the variable reflectance of reflective element 114 and for operating other electrical or electronic functions supported in rearview assembly 116. Circuit board 118 may support, for example, light emitting diodes (LED's) for illuminating indicia on display elements provided on chin or eyebrow portion of case bezel region 123 or display areas provided on reflective element 114, or map or dash board lights 140. Circuit board 118 may be independently supported from reflective element 114 or in casing 112 or may be mounted to rear surface 14a of the reflective element on a separate plate or may be directly adhered to the rear surface by a suitable adhesive. Reference is made to U.S. Pat. Nos. 5,671,996 and 5,820,245, the disclosures of which are herein incorporated by reference in their entireties. It should be understood that one or more user actuatable buttons or one or more information displays may be located elsewhere on the mirror assembly or separately in a module, for example of the type disclosed in pending U.S. patent application Ser. No. 09/244,726 entitled "REARVIEW MIRROR ASSEMBLY INCORPORATING VEHICLE INFORMATION DISPLAY", filed by Jonathon E. DeLine and Niall R. Lynam, which is assigned to Donnelly Corporation of Holland, Mich., the disclosure of which is herein incorporated by reference in its entirety.

The interior mirror assembly of this invention may optionally include storage spaces, accessories, utilities and features as described in U.S. patent application Ser. No. 09/449,121, entitled "Rearview Mirror assembly With Utility Functions" to Barry W. Hutzel et al of Donnelly Corporation, filed Nov. 24, 1999, the entire disclosure of which is hereby incorporated by reference herein.

For example a display screen mounted at or part of rearview mirror assembly 16 (such as part of moveable housing 16b or of module 10 or attached to mounting arm 16c or viewable through reflector 16d or attached to mirror button 16a or attached to the mount of arm 16c to button 16a) can form a viewing screen for a baby minder system, such as the vehicle interior monitoring system described in U.S. Pat. Nos. 5,877,897 and 5,760,962 or the rear vision system described in pending U.S. patent applications Ser. No. 09/361,814, filed Jul. 27, 1999 and Ser. No. 09/199,907 filed Nov. 25, 1998, and U.S. patent application Ser. No. 09/433,467, filed Nov. 4, 1999, entitled "VEHICLE INTERIOR MIRROR ASSEMBLY" to Patrick Heslin and Niall R. Lynam, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganice), and the like, and most preferably such non-incandescent sources are low power and are directed low intensity sources, such as described in U.S. Pat. No. 5,938,321 and copending application entitled "INTERIOR MIRROR ASSEMBLY FOR A VEHICLE INCORPORATING A SOLID-STATE LIGHT SOURCE", Ser. No. 09/287,926, filed Apr. 7, 1999, which are incorporated herein by reference in their entireties. The baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814 entitled "Wide Angle Imaging System" to Bos of Donnelly Corporation, filed Jul. 27, 1999, and in U.S. patent application Ser. No. 09/199,907 entitled "Wide Angle Image Capture System for Vehicle" to Bos et al of Donnelly Corporation, filed Nov. 25, 1998, and in U.S. patent application Ser. No: 09/313,139 entitled "Rearview Vision System With Indicia Of Backup Travel" to Schofield et al. of Donnelly Corporation, filed May 17, 1999, the disclosures of which are hereby incorporated by reference herein. For example, when the driver selects a reverse gear, a view of the back-seat of the vehicle is automatically replaced with a view rearward of the vehicle provided by the rearward facing reverse-aid camera (typically mounted at the vehicle rear license plate area or the like) and when reverse gear is disengaged, the view of the back-seat is once again displayed at the display screen visible to the driver in the interior cabin of the vehicle (such as at, on or in mirror assembly 16). Also, when a baby is small, a rear-facing child seat is preferred (i.e. the child faces the rear of the vehicle cabin) whereas as the child grows, a forward facing child seat is preferred. In order to cater for forward-facing child seats versus rearward-facing child seats, two cameras can be mounted such as in the roof area of the vehicle. One forward viewing camera (i.e. viewing forward of the vehicle relative to the direction of forward motion of the vehicle) can be mounted at a roof location (such as above the vehicle rear window) to view a baby seated in a rear-facing baby seat and a second rearward viewing camera (i.e. viewing rearward of the vehicle relative to the direction of forward motion of the vehicle) can be mounted at a roof location (such as above the vehicle front windshield or as part of mirror assembly 16) to view a child seated in a forward-facing baby seat. A switch can be provided to allow the driver to choose to use any one of the forward viewing camera and the rearward viewing camera. Optionally and preferably from a cost viewpoint, a single camera module can be provided that can connect to and/or dock into two or more spaced and separate camera module receiving stations. One (i.e. a first) camera module receiving station can be high-mounted at a forward location in the vehicle cabin (such as in a header console above and adjacent the front windshield or in the headliner above and adjacent the front windshield or as part of mirror assembly 16) and a second camera module receiving station can be located at a rearward location in the vehicle cabin (such as above and adjacent to the rear window, or at a position in the headliner of the vehicle that is located above and rearward of the rear seat, or as part of a dome lamp or other interior lighting assembly, preferably a lighting assembly comprising a plurality of light emitting diodes and most preferably a lighting assembly comprising a plurality of light emitting diodes comprising at least one white light emitting diode) that is spaced and separate from the location of the first camera receiving station. A single camera module can be provided that plugs into, and electrically/electronically connects to, any one of the two camera receiving stations provided. When the camera module is plugged into the first camera receiving station, the camera field of view is directed rearwardly in the vehicle cabin to monitor a back seat area and thus monitor a child strapped in a forwardly facing child seat and the like. The camera receiving station provides power to the camera and receives video signals generated by the camera. If, however, a rearward facing baby seat was mounted on the rear seat, the driver can unplug the camera module from the first camera receiving station and plug it into the second camera receiving station. When plugged into the second camera receiving station, the camera lens faces forwardly in the cabin and its field of view is directed to capture and hence display the rearward facing baby strapped in the rearwardly facing baby (or child) seat. Optionally, a plurality of camera receiving stations (such as three or four or more) can be provided to allow a single camera be mounted at a plurality of locations in a vehicle cabin with its field of view selected to be directed to a specific portion of the vehicle cabin by plugging the camera module into a specific one of the available plurality of camera receiving stations. This allows a "plug and view" capability for the vehicle user. As an alternate, or as a supplement, to a plurality of camera receiving stations, a camera can be movably mounted on a rail that also functions as a power strip that is affixed to an interior vehicular cabin structure such as a headliner of the vehicle or to a window of a vehicle (such as is disclosed in U.S. patent application Ser. No. 08/895,729 entitled "Vehicle Window Assembly For Mounting Interior Vehicle Accessories" to John W. Carter et al. of Donnelly Corporation, filed Jul. 17, 1997, the entire disclosure of which is hereby incorporated by reference herein). Thus, for example, a camera can move along a channel in a rail attached to a vehicle cabin roof headliner. When stopped at a particular position along the rail, the camera module can receive power input from, and deliver signal output to, the rail such as via conductive brush connectors such as carbon brushes. Alternately, the camera module can transmit video image data wirelessly within the cabin, such as by infrared or by radio-frequency transmission, to a cabin-mounted receiver (or externally of the vehicle to a remote receiver such as might be used in a cabin security monitoring camera-based system that, for example, monitors the interior vehicle cabin while the vehicle is parked in order to detect intrusion by an unauthorized party). Optionally, the camera module mounted in the vehicle cabin is detachably mounted so that it can be removed from the vehicle both as an anti-theft device and in order to allow the camera to be used outside the vehicle such as in a child's crib in a home. In this regard, a video camera (such as the detachable vehicle camera module) can be mounted at a distance from the vehicle such as in the like of a child's bedroom in a house to monitor, for example, a child sleeping in a crib, and its video image can be wirelessly transmitted (such as by radio-frequency transmission) or transmitted via a wireless INTERNET linkage to the vehicle so the driver and/or other occupants of the vehicle can view the video image of the child in the crib at home on a vehicular video screen, preferably on a screen mounted at, on or in mirror assembly 16, while the vehicle is located and operating at a distance from the location of the home where the camera generating the video image is located. Also, the camera used in the applications described above can be an autofocusing and/or autoexposure camera using an autofocusing lens system and/or an autoexposure system (such as via an automatically adjustable iris system). Also, optionally, the field of view of the lens of the camera can be adjusted to view a multitude of locations in the vehicle cabin such as by a joystick-control or the like.

The display element located at or as part of interior mirror assembly 16 may perform a single display function or multiple display functions, such as providing indication of an additional vehicle function or functions, for example a compass mirror display function, a temperature display function, a tire pressure/status display function, a status of inflation of tires display function, computer display including e-mails and INTERNET access, a passenger air bag disabled display function, an automatic rain sensor operation display function, telephone dial information display function, highway status information display function, blind spot indicator display function, or the like. Such displays may be an alpha-numeric display or a multipixel display, and may be fixed or scrolling. In addition, the display element may comprise a television screen and/or video screen. For example, display element 130

(FIG. 10) may comprise a generally planar element or may comprise a convex element. Alternately, display element 130 may be separately formed and include tabs or receiving structures on either side adapted to fit within receiving structures or tabs, respectively, formed in the inside surfaces of casing 112 for assembly after molding of casing 112.

As it would be understood by those skilled in the art, the electrically operated display and other devices optionally provided in mirror assembly 16 are conveniently connected to the electrical system of the vehicle in which the present invention is mounted via electrical wiring.

Alternately, interior mirror assembly 16 may comprise an information display element which conveys information to the vehicle operator and/or other occupants of the vehicle or may be a video screen or the like. For example, mirror assembly 16 may comprise a personal communication device, such as a PALM organizer or the like, including a video screen, preferably a touch sensitive video screen such as PALM Pilot™ such as is available from 3COM, Corp. or the like, which is adapted for input by the touch of a human finger or stylus. In which case, it is preferred to provide at the interior mirror assembly an attachment member, such as is described in U.S. application Ser. No. 09/449,121, filed Nov. 24, 1999, referenced above, for holding a stylus pen which interacts with touch sensitive screen or similar computer readable screen entry device. Optionally, the stylus is tethered to the mirror assembly, for example a coiled tether or a retractable tether or by other conventional means.

Light emitting sources, such as light emitting diodes, can be used to provide back lighting of display element 130. Light emitting diodes provide low level non-incandescent white light for illuminating indicia on display element 130. However, it should be understood that other LED's providing light and colors other than white, such as amber, yellow, green, orange red, blue, or their combination, or the like may be used. Alternately, other light emitting elements can be used to display information on display element 130, such as incandescent displays, vacuum fluorescent displays, electroluminescent displays (both organic and inorganic), light emitting diode displays, cathode ray tube displays, field emission displays, E-ink displays, or organic emitting polymer displays or the like. Examples of displays may be found in copending application entitled "REARVIEW MIRROR ASSEMBLY INCORPORATING VEHICLE INFORMATION DISPLAY", Ser. No. 09/244,726, filed Feb. 5, 1999, by Jonathan DeLine and Niall R. Lynam, or U.S. Pat. No. 5,530,240, and U.S. patent application Ser. No. 09/433,467, filed Nov. 4, 1999, entitled "VEHICLE INTERIOR MIRROR ASSEMBLY" to Patrick Heslin and Niall R. Lynam, commonly assigned to Donnelly Corporation, which are herein incorporated by reference in their entireties.

Interior mirror assembly 16 may also incorporate an in-vehicle train approaching warning system. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. Vehicle to road-side communication antennas can be attached to railroad signs, crossing barriers, and the like and can transmit to antennas mounted in the vehicle located such as within assembly 16 or within an interior cabin trim item or side exterior rearview mirror assembly. One such track side communication system is available form Dynamic Vehicle Safety Systems of Amarillo, Tex., which detects signals from trains approaching a crossing and transmits these signals along the road to forewarn of a railroad crossing ahead.

It is also possible to incorporate low level console or instrumentation lighting for vehicles in assembly 16 by fitting a low level non-incandescent light emitting light source such as a light emitting diode for illuminating an instrument panel or console as disclosed in commonly assigned U.S. Pat. No. 5,671,996, the disclosure of which is hereby incorporated by reference. A variety of emitting sources may be used such as high intensity amber and reddish orange light emitting diode sources, such as solid state light emitting diode LED sources utilizing double hydro junction AIGaAs/GaAs Material Technology such as very high intensity red LED lamps (5 mm) HLMP-4100/4101 available from Hewlett Packard Corporation of Pallo Alto, Calif., or transparent substrate aluminum indium gallium phosphide (AlInGaP) Material Technology, commercially available from Hewlett Packard Corporation, of Pallo Alto, Calif. Also, blue or white LEDs can be used or a combination of individual different colored diodes such of red, blue, white, green, amber, orange etc can be used with color mixing thereof to form a desired color or to deliver a desired local intensity of illumination. White emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, entitled "Rearview Mirror Assembly With Added Feature Modular Display" to Timothy G. Skiver et al of Donnelly Corporation, filed Nov. 24, 1999, and in U.S. patent application Ser. No. 09/244,726 entitled "Rearview Mirror Assembly Incorporating Vehicle Information Display" to Jonathan E. DeLine et al of Donnelly Corporation, filed Feb. 5, 1999, the entire disclosures of which are hereby incorporated by reference herein. A variety of constructions are used including GaAsP on GaP substrate, gallium aluminum phosphide, indium galium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as reading light or as an interior light or as an illumination source for an interior vehicle cabin-mounted and monitoring camera (most preferably illuminating the target area with white light). Such a cluster of high efficiency LEDs can be mounted as part of mirror assembly 16 (such as in the bottom wall of casing 16b or in a pod attached to or part of one of arm 16c or button 16a) so as to project an intense pattern of light generally downwardly into to vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, which issued on Nov. 28, 2000, entitled "Lighting Device For Motor Vehicles" to Peter Fuerst and Harald Buchalla of Donnelly Hohe Gmbh & Co, KG, filed Feb. 12 1999, the entire disclosure of which is hereby incorporated by reference herein.

The concepts of this present invention can be used with other interior rearview mirror assemblies which are equipped with a variety of features and accessories, such as a home access transmitter, a high/low (or daylight running beam/low)

headlamp controller, a hands free phone attachment, a video device, such as a video camera for internal cabin surveillance and/or video telephone function, a remote keyless entry receiver, a compass, a seat occupancy detection, multiple reading lights, a trip computer, an intrusion detector, and the like. Display element 130 may also include a compass/temperature and a clock display, fuel level display, and other vehicle status and other information displays.

As it would be understood by those skilled in the art, the electrically operated display and other devices optionally provided at, on or in mirror assembly 16 are conveniently connected to the electrical system of the vehicle.

The use of, for example, the mirror-mounted digital sound processing system of the instant invention in conjunction with electrically operated interior rearview mirrors has the further advantage of permitting electrical coupling of the mirror-mounted digital sound processing system to the power supply of the vehicle by the pre-existing wire harnesses serving the rearview mirror. Thus, the electrical coupling of the digital sound processing circuitry can be by direct connection with the existing wire harness or in parallel through an adapter plug. This particularly facilitates a retrofit such as might occur as in the after-market or at a dealership that is a result of an option selection. Alternately, the interior mirror assembly can include a vehicle power socket, connected to the vehicle ignition system or battery electrical system, (such as the cigarette lighter type socket conventional on many automobile) into which other accessories can be plugged. For example, a "cigarette-lighter" type of socket can be provided at the rear or at the bottom of the interior mirror case, into which a vehicle occupant can plug an electrically operated (typically 12V) accessory such as a radar detector or the like.

As previously described, mirror assembly 16 may include a video screen. For example, a display screen can be placed to the side of reflector 16d in casing 16b. In preferred form, the display screen is separate from reflector 16d. Most preferably, video screen is canted toward the driver when mirror housing 16b is in its normally adjusted position. The mirror-mounted video screen can display output from such as a rear vision back-up camera, such as disclosed in copending applications Ser. No. 09/199,907, filed Nov. 25, 1998, and U.S. Ser. No. 09/361,814, filed Jul. 27, 1999, commonly assigned to Donnelly Corporation, the disclosures of which are herein incorporated by reference in their entireties, a baby minder camera, such as the vehicle interior surveillance camera disclosed previously, vehicle instrument status, such as vehicle information display, such as information relating to fuel gauge levels and the like.

Optionally, and as disclosed in U.S. patent application Ser. No. 09/449,121, filed Nov. 24, 1999, disclosed and referenced above, interior rearview mirror assembly 16 may comprise accessories that can be docked to the assembly for purpose of storage, battery charging, electrical powering, data input and/or output, and similar functions. Such dockable features are detachable by a user of the vehicle from the mirror assembly 16, and are optionally removable from the vehicle for use outside the vehicle. For example, a dockable feature may comprise a light assembly, such as a flashlight assembly, or may comprise a cellular phone, a phone module, pager, INTERNET connector, or the like. In the case of docking a telecommunication device such as a phone or a pager, mirror assembly 16 is preferably adapted to connect to the telecommunication device such as a phone in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

Preferably, the interior rearview mirror assembly 16 includes a power source, such as a recharger, such as in housing 16b, that recharges the battery or batteries in any dockable accessory, which is stored or attached thereto. As previously noted, such dockable accessories can include pagers, cellular phones, flash lights or the like. In this manner, the dockable accessory can be docked for recharging. In the case of the light assembly, the light assembly can be docked for use as a map reading light or the like. When undocked, the light assembly (which includes internal batteries) may be used as a flashlight, as previously noted.

In the case of a dockable phone, housing 16b optionally includes at least one speaker and microphone, such as disclosed in U.S. patent application Ser. No. 09/382,720, filed Aug. 25, 1999, by DeLine et al. When the phone is docked, the phone may be optionally connected to the vehicle system such that the vehicle system enables the speakers and microphones to provide hands-free operation of the phone. Actuation of the hands-free phone may be achieved when the phone is docked or by a separate switch mounted, for example on the dashboard or, alternately, to the interior mirror assembly.

Alternately, the phone module of a cellular or digital phone may be docked on the mirror housing such that the vehicle system couples the phone module to the speakers and microphones to provide a hands-free phone system. In this manner, the module can be quickly and easily docked and, further, removed for replacement into the phone housing.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in copending provisional application Ser. No. 60/131,593, filed Apr. 29, 1999, entitled "VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE", which is herein incorporated by reference in its entirety. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

A variety of electrical and electronic features can be incorporated into the rearview mirror assembly, such as those disclosed in U.S. patent application Ser. No. 09/433,467, filed Nov. 4, 1999, entitled "VEHICLE INTERIOR MIRROR ASSEMBLY" to Patrick Heslin and Niall R. Lynam, commonly assigned to Donnelly Corporation, which is herein incorporated by reference in its entirety. For example, a microphone or a plurality of microphones may be incorporated, preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in United States patent application Ser. No. 09/382,720, filed Aug. 25, 1999, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, rain noise, climatic noise, road noise, engine noise, traffic noise, HVAC noise, and the like. Digital sound processing techniques, as known in the acoustics arts and such as are disclosed in U.S. Pat. No. 4,959,865 entitled "A METHOD FOR INDICATING THE PRESENCE OF SPEECH IN AN AUDIO SIGNAL", issued Sep. 25, 1990, to Stettiner et al. (the disclosure of which incorporated by reference herein), are particularly useful to enhance clarity of vocal signal detection when a single microphone is used, located in the interior mirror assembly 16 such as in casing 16b, as part of a vehicular wireless communication system such as General Motors' ONSTAR™ system. Use of digital signal processing and a single mirror-mounted microphone (such as is described in U.S. patent application Ser. No. 09/396,179, filed Sep. 14, 1999, entitled "INDICATOR FOR VEHICLE ACCESSORY", the disclosure of which is incorporated by reference herein) is particularly advantageous for economical achievement of clear and error-free transmission from the vehicle, while operating along a highway, to a remote receiver, particularly in speech-recognition mode. Although advantageous with a single-element mirror-mounted microphone (or for a microphone mounted elsewhere in the vehicle cabin such as in the header region), digital sound processing is also beneficial when multiple microphones are used. For example a first microphone, mounted in the mirror casing 16b, can be directed principally towards the mouth of the driver and a second microphone can be directed so as to detect vehicular ambient noise such from HVAC, windshield vibration etc. A signal indicative of the ambient noise can be generated by processing the output of the second microphone, and this signal can be subtracted from a signal generated by processing the output of the first microphone to form a signal substantially representative of the speech picked up by the first microphone. Techniques and circuitry to achieve such speech enhancement are known in the acoustics art, such as are disclosed in U.S. Pat. No. 5,381,473, issued Jan. 10, 1995, entitled "NOISE CANCELLATION APPARATUS" to D. Andrea, the disclosure of which is hereby incorporated by reference herein. Also, noise cancellation techniques such as destructive interference can advantageously be used, whereby the signal as picked up by the microphone is processed, the human vocal signal is distinguished from the noise signal, and whereby the noise signal is fed back 180 degrees out of phase with itself in order to cancel out the noise by destructive interference and so enhance the vocal signal to background noise ratio. Digital sound processing is preferably accomplished using a microprocessor. A variety of microprocessors can be used such as a single-chip microcomputer optimized for digital signal processing and high speed numeric processing such as the ADSP-218x digital signal processors such as the ADSP-2186 single-chip microcomputer, which integrates 40 kilobytes of on-chip memory (including 8K words (24-bit) of program RAM and 8K words (16-bit) of data RAM) along with serial ports, DMA ports, timers, I/O lines, and interrupt capabilities. The ADSP-2186 microcomputer and the ADSP-218x digital signal processors are available from Analog Devices, Inc., Norwood, Mass., and operate with a 16-bit architecture at a computational speed in the 28 to 75 MIPS/MHz range. Also, a digital signal processor that comprises a microcomputer (comprising a microprocessor central computing processor, memory, input/output ports, timers etc packaged on a single chip) is available from Texas Instruments Inc. of Dallas, Tex. under the tradename TMS320LC203 digital signal processor. The TMS320LC203 digital signal processor executes at 20 MIPS (millions of instructions per second) and operates at 40 Mhz. The TMS320LC203 digital signal processor has 2 serial ports, 1 timer, 544 words of RAM and a processor cycle time of 50 nanoseconds. In general, the choice of which digital signal processor to use is influenced by its performance (as indicated by its MIPS rating) and its cost. Since automotive applications are cost sensitive, currently commercially available digital signal processors with a MIPS performance rating in the 1 to 10 range are economical. For the noise cancellation needs in an automobile, it is preferred that the digital signal processor used in the digital sound processing system have a MIPS performance of at least 1 MIPS; more preferably at least 5 MIPS; most preferably at least 10 MIPS. Future improvements in microcomputer design and construction promise to provide economical digital sound processors with a MIPS rating of at least 100 MIPS. In a vehicle wireless communication system installed in a vehicular cabin, location of the microphone(s) in the interior mirror assembly (such as in casing 16b) is advantageous. For digital sound processing of the sound signal detected by the mirror-mounted microphone, an analog to digital converter can be also located at the interior rearview mirror assembly (such as in casing 16b) that converts the analog microphone sensor output to digital form. The microprocessor for performing the digital sound processing algorithms and analysis can also be located at the interior rearview mirror location (such as in casing 16b). Alternately, the microprocessor performing the digital sound processing analysis can be located elsewhere in the vehicle cabin (such as in the vehicle dash, preferably sharing circuitry with other functions of the vehicle wireless communication system), and with the digitized output signal from the A/D converter linked to the mirror-mounted microphone being fed to the microprocessor via a wire link or via a car area network (a.k.a. controlled area network) or via a vehicular local area network or via an in-cabin, short-range radio transmission network such as via the BLUETOOTH system described below.

Also, since ambient noise in the vehicle cabin is present constantly whereas the speech of the driver and/or passenger is episodical in that there are periods of time when the speaker is talking and there are periods of time when the speaker is silent, the digital sound processing system of the present invention can recognize that a vocal content is absent from the signal being output from the vehicular microphone. The digital sound processor can then recognize, record and/or characterize the signal input during periods of time the speaker is silent as being indicative of ambient noise, and signal averaging and cancelling techniques, such as destructive interference and signal averaging, can be employed to reduce the noise content of the signal output by the digital sound processor. In this regard, and when the audio system comprises an telematic system such as ONSTAR™ or a cellular phone, an input can be conveyed to the digital sound processor that a party external to the vehicle is speaking. Since mostly at such time the driver and/or passengers in the vehicle will be silent as they listen to what the external party is saying, the digital sound processor can recognize that any sounds picked up during these periods of vehicle occupant silence are most likely due to ambient noise [along with any speech by the external party being played by the vehicle loudspeakers and picked up by the vehicle microphone(s)], and noise cancellation techniques, as known in the acoustics arts, can be utilized to enhance vocal to non-vocal signal to noise ratio once the vehicle-based party speaks.

Also, the digital signal processor, once speech from a vehicle-based occupant is recognized, can turn down or turn off the volume of any radio or music player in the vehicle for the period that the vehicle-based speaker is talking (and while return speech from any external party is being picked up by the vehicular microphone)

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Preferably, digital filtering is used. Also, physical techniques such as sound insulation, acoustic wave guides, angling of microphones to selectively detect speech versus background noise, use of a directed microphone directed to a potential human speaker in conjunction with a more omnidirectional microphone/sensor microphone intended to detect background noise can be used. Techniques useful to enhance vocal to noise signal ratio include use of analog and/or digital low-pass filtering to limit examination of signal content to, for example, less than 1000 Hz. or less than 750 Hz. (and so help distinguish vocal signal from noise signals), include use of syllabic rate filtering such as is described in U.S. Pat. No. 4,484,344, include use of a hangover time function such as disclosed in U.S. Pat. No. 4,187,396, include use of a digital sound switch and dual threshold detection such as disclosed in U.S. Pat. No. 4,052,568 and include noise canceling microphones and techniques such as disclosed in U.S. Pat. No. 5,909,495 (the disclosures of the above cited U.S. patents are incorporated by reference herein). The vehicular microphone can be voice-activated such as by a digital voice operated switch such as is disclosed in U.S. Pat. No. 5,251,263, the disclosure of which is incorporated by reference herein. An adaptive signal processing system can be used to enhance vocal to noise ratio. Adaptive noise cancellation techniques can be used to produce a speech indication signal in response to detection of voice information in the presence of background vehicular noise such as are described in "Adaptive Noise Canceling: Principles and Applications" Proc. IEEE, vol. 63, pp. 1692-1716, December 1975 by B. Widrow et al., and "Adaptive Noise Canceling for Speech Signals", IEEE Trans. Acoust. Speech and Sig. Proc., vol. ASSP-26, No. 5, October 1978, by M. Sambur, and U.S. Pat. No. 5,033,082 entitled "COMMUNICATION SYSTEM WITH ACTIVE NOISE CANCELLATION", issued Jul. 16, 1999, to Eriksson et al, and U.S. Pat. No. 5,251,263 entitled "ADAPTIVE NOISE CANCELLATION AND SPEECH ENHANCEMENT SYSTEM AND APPARATUS THEREOF", issued Oct. 5, 1993, to Andrea et al, the disclosures of which are hereby incorporated herein in their entirety. Mechanical cancellation of ambient noise can be provided, as can a noise canceling pressure gradient microphone, preferably in conjunction with acoustic ports including voice and noise ports. Such a system is disclosed in World Patent publication WO 9817046 A1 to D. Andrea, published Apr. 23, 1998, and entitled "NOISE CANCELING ACOUSTICAL IMPROVEMENT TO WIRELESS TELEPHONE OR CELLULAR PHONE", the disclosure of which is hereby incorporated by reference. A pressure gradient microphone, as known in the acoustic arts, can be used to reduce the background vehicular noise as detected by a vehicular mirror-mounted microphone, or alternatively, an acoustic feedback system, preferably including compensation filters, can be used. Also, closed-loop active noise reduction techniques and other noise reduction techniques can be used such as disclosed in U.S. Pat. Nos. 2,972,018; 3,098,121; 4,833,719; 4,878,188; 4,977,600; and 5,138,664, and in Japanese Patent Abstract No. 3-169199, the disclosures of which are incorporated by reference herein. An adaptive noise cancellation and speech enhancement system and apparatus suitable for use in a vehicle with a mirror-mounted microphone is disclosed in U.S. Pat. No. 5,251,263, the disclosure of which is incorporated by reference herein. This adaptive noise cancellation system is particularly beneficial when multiple vehicular microphones are used. Other noise cancellation techniques useful for vehicular microphones, and particularly for mirror-mounted microphones that provide input to wireless communication systems, particularly in voice-recognition mode, are disclosed in U.S. Pat. Nos. 5,732,143; 5,825,897; and 5,673,325, the disclosures of which are incorporated by reference herein.

Also, an indicator such as disclosed in U.S. patent application Ser. No. 09/396,179, filed Sep. 14, 1999, entitled "INDICATOR FOR VEHICLE ACCESSORY", the disclosure of which is incorporated by reference herein, can be incorporated into the interior mirror assembly that indicates to the driver and/or passengers that speech being detected by a mirror-mounted microphone (or a microphone located elsewhere in the vehicle cabin such as in a header console) is being transmitted and received clearly and error-free by a remote wireless receiver such as an ONSTAR™ operator or a voice recognition system such as is common when calling airlines, services and the like. For example, the signal as wirelessly transmitted from the audio system in the vehicle to the remote receiver may be echoed or retransmitted back to the vehicle where, upon receipt of the retransmitted signal at the vehicle, an in-vehicle voice recognition system interprets the as-received retransmitted signal and either speaks the words/numbers interpreted to the driver for confirmation, or displays the message as received in the vehicle after retransmission so the driver/passenger receives an audible and/or visual indication of what the remote voice recognition transcriber is receiving. If the in-vehicle voice recognition system/in-vehicle indicator is not indicating the expected message, then the driver/passenger will know that the original transmission to the remote voice recognition system was not clear and contained error, and take appropriate action such as repeating the message. By retransmitting back to the vehicle, and confirming in-vehicle, the vehicle occupants can be assured that wireless transmission to the like of a voice recognition system is clear and error-free.

The interior mirror assembly may include a variety of information displays such as a PSIR (Passenger Side Inflatable Restraint) display, an SIR (Side-Airbag Inflatable Restraint), compass/temperature display, a tire pressure status display or other desirable displays, such as those described in United States patent application Ser. No. 09/244,726, filed Feb. 5, 1999, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the vehicle cabin such as in the interior mirror assembly, and tire pressure status can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the module 10, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in casing 16b, and/or elsewhere in the interior mirror assembly (such as in the housing disclosed in U.S. patent application Ser. No. 09/433,467, filed Nov. 4, 1999, entitled "VEHICLE INTERIOR MIRROR ASSEMBLY" to Patrick Heslin and Niall R. Lynam.

Providing a docking capability and/or storage space for the like of a cellular phone has several advantages, especially when used in conjunction with an in-vehicle microphone and ONSTAR™ or similar vehicular wireless communication system. In such a system, the vehicle typically comes equipped from the original equipment manufacturer (typically an automaker such as General Motors, Ford or the like) with an excellent radio/CD/tape audio system with good speakers, amplifiers, graphic equalizers etc. Coupled with a high quality microphone, the quality and power of the vehicular audio system typically exceeds that found in a hand-held cellular phone. Also, when the vehicle is equipped with an ONSTAR™ system, the vehicle is typically already provided with a quality wireless transmitting/receiving antenna, and often with a GPS system as well. Thus, providing a docking function (preferably at the interior rearview mirror but at other location such as the header s console or the like is contemplated) has advantages beyond providing a recharging power source to the personal hand-held phone (or pager or the like). Once docked (which encompasses linking the portable unit to the interior mirror assembly via a cable or via a cableless connection such as by a remote IR link), the driver and/or passengers can optionally and preferably make and receive telephone calls via their docked personal phone, but with the audio system being provided by the in-vehicle, pre-existing, speakers, amplifiers, microphone etc. Preferably, whenever a phone call is initiated, any radio station or other music or play though the vehicle audio system is turned off for the duration of the phone call. Also, the ringing tone indicating a call is being received at the docked personal phone preferably sounds through the car audio system so that it is audible even if the car audio is playing music or the like. In this manner, the driver and/or passenger can be contacted via their personal cellular phone number while driving on the highway. As regulations increase forbidding the use cellular phones while driving, unless hands-free, use of the existing vehicle audio system to make and receive calls is advantageous as quality of sound is enhanced thereby. The present invention contemplates a personal cellular phone having a detachable module that includes the circuitry that makes that phone specific and unique in terms of caller identifier. Thus, when the driver, for example, enters the vehicle, he/she detaches the identifier module from the personal mobile hand-held cellular phone and plugs it to a receiving portion of the in-vehicle wireless transmission system (that may comprise an antenna, speakers, an amplifier, a microphone, a keypad etc). Once the identifier module is plugged into the vehicular wireless communication system, the vehicle wireless communication system now emulates the hand-held personal phone, allowing calls be made or received at the personal phone number of the owner of the personal cellular phone. All such in-vehicle communication can be in voice-recognition mode, or a keypad can be provided for the driver to key in a phone number. Although illustrated here for a cellular phone, these concepts have broad application to like of hand-held computers and the like. Also, soon all cellular phone calls will be traceable as to the geographic location of the call. Thus, by making a call from the vehicle, the location of the vehicle is traceable by the likes of the phone service provider such as MCI, SPRINT and the like. Thus, the geographic location of the vehicle can be identified by the driver placing a call. A user-operated "SOS" button can be provided in the vehicle such that, when activated, a cellular phone call is initiated, this call is directed to the cellular phone company, the cellular phone company identifies the vehicle's location, and the cellular service provider, once the vehicle's location is identified, automatically connects the phone to the emergency "911" service particular to the location of the vehicle. Thus, no matter where the call is made from, the driver of the vehicle is automatically connected to the emergency services.

Also, where a dockable accessory is used and in other situations, the interior mirror assembly may include a recharging unit and/or a low voltage (typical less than 10 volts, such as 5 volts or lower) power source (preferably of direct current power) to power the likes of a cellular phone, lap-top computer of the like. A socket for this purpose may be provided on the mirror casing 16b (or elsewhere on the interior mirror assembly), or a powering and/or recharging cable can be stored in casing 16b, and pulled out (preferably under spring-load so as to automatically rewind) as required to power the accessory. Preferably, the recharging unit, including any associated electronic circuitry, is housed in casing 16b of the interior rearview mirror assembly.

Referring to FIG. 10, reflective element 114 may comprise an electrochromic element of an electrochromic element module. The electrochromic mirror element, for example, includes a front or first substrate (that is the substrate closest of the two to the driver when the mirror assembly is mounted in the vehicle) and a rear or second substrate (typically glass substrates) with an electrochromic medium sandwiched between the substrates. The electrochromic element module preferably includes a printed circuit board (PCB) which may be attached to its rear surface 114a of the reflective element 114 as shown in FIG. 10, by for example an adhesive. An example of such an arrangement as disclosed in U.S. Pat. No. 5,820,245, commonly assigned to Donnelly Corporation, which is incorporated in its entirety by reference herein. The PCB optionally includes glare sensing and ambient photo sensors and assembly electrochromic circuitry that automatically dims the reflectivity of the electrochromic mirror element when glare conditions are detected at night time when mounted in the vehicle. Alternately, the PCB may be snap connected, by a clip or otherwise attached, to a plastic plate that itself is adhered to the electrochromic element. Importantly, the electrochromic module comprising the electrochromic reflective element and attached electronics, may provide scatter proofing means, and the like. Preferably, the electrochromic element module forms a relatively slim package, at its widest cross-section the package is preferably less than or equal to about 25 mm in dimension, more preferably less than or equal to about 15 mm in dimension, and most preferably less than or equal to about 8 mm in dimension. By placing, as shown in FIG. 10, all necessary electronics and reflector element forward in the case toward the driver, the space between the rear of the reflector module can be utilized for storage, such as is disclosed in U.S. patent application Ser. No. 09/449,121, filed Nov. 24. 1999, entitled REARVIEW MIRROR ASSEMBLY WITH UTILITY FUNCTIONS referenced above. Preferably, the reflective element comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the frontmost surface of the rear substrate (the third surface as known in the mirror art) is reflector coated with a high reflecting metal film such as of aluminum or silver, or an alloy of aluminum or silver.

Optionally, the front surface 114b of the front substrate (i.e. the first surface as known in the mirror art) can be coated with a surface coating or otherwise modified so as to reduce the build up of condensation or mist such as can occur in humid climates. For example, the front surface of the front substrate (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system such as is disclosed in Japanese Patent Abstract JP11050006A, issued Feb. 23, 1999, titled "Pretreatment of surface Forming Photocatalytic Hydrophilic Film and Cleaning Agent and Undercoating Composition Used Therein" to Mitsumasa et al of Toto Ltd, and in JP10330131A, issued Dec. 15, 1998, titled "Hydrophilic Thin Film and Vehicular Mirror and Glass Product Using The Same Hydrophilic Thin Film" to Tsutomu et al of Ichikoh Ind Ltd, and in JP10036144A, issued Feb. 10, 1998, titled "Antifogging Element" to Toru et al of Murakami Corporation, and in U.S. Pat. No. 5,724,187, issued Mar. 3, 1998, titled "Electrochromic Mirrors and Devices" to Varaprasad et al of Donnelly Corporation, the disclosures of which are hereby incorporated by reference herein. Also, such wetting characteristic modification coatings and techniques, such as photocatalytic hydrophilic coatings, can be used for the first (frontmost) surface of a non-electrochromic reflective element such as a prismatic interior mirror reflective element (and for the first surface of electrochromic exterior mirror reflective elements and of metal coated, such as chromium coated, exterior non-electrochromic mirror reflective elements).

Preferably, an electronic accessory such as any of those disclosed above can be provided as a module that can be inserted and received in the rear view mirror assembly 16, and that can make electrical connection (such as by a plug and socket) to the rear view mirror assembly 16. This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, casing 16b may contain a sensor or sensors for vehicle altitude and/or incline, seat occupancy or air bag activation enable/disable, or (if a viewing aperture is made in the housing 16b) photosensors for headlamp intensity/daylight intensity measurement. Alternatively, housing 16b may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted elsewhere in mirror assembly 16.

Also, a photosensor may be included in assembly 16, preferably a skyward facing photosensor that views skyward through the vehicle windshield for the purpose of providing automatic headlamp activation/deactivation at dusk/dawn. Also, assembly 16 may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. Pat. application Ser. No. 09/382,720, filed Aug. 25, 1999, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing 16b includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver.

The housing 16b and/or other components of mirror assembly 16 may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, the disclosure of which is hereby incorporated by reference herein.

Restricted-range wireless communication systems such as BLUETOOTH, as known in the telecommunications art, can facilitate voice/data, voice over data, digital and analog communication and vehicle/external wireless connectivity, preferably using the interior and/or exterior mirror assemblies as transceiver/display/user-interaction sites. Electronic accessories to achieve the above can be accommodated in housing 16b, and/or elsewhere in the interior mirror assembly (such as in the mirror bracket). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No. 09/057,428, filed Apr. 8, 1998, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically $1/10$ of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about $1/10^{th}$ of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by day. Such displays can be located at the interior rearview mirror, preferably, or optionally elsewhere in the vehicle cabin such as in the dash, in the windshield header at the top interior edge of the windshield, in a seat back, or the like.

Also, a passenger side inflatable restraint (air-bag) status display as well as user-actuatable buttons/input devices and lighting devices may be provided at, on or in mirror assembly 16 such as are disclosed in U.S. patent application Ser. No. 09/448,700, entitled "Rearview Mirror Assembly With Added Feature Modular Display" to Timothy G. Skiver et al of Donnelly Corporation, filed Nov. 24, 1999, the entire disclosure of which is hereby incorporated by reference herein.

Figure 11:
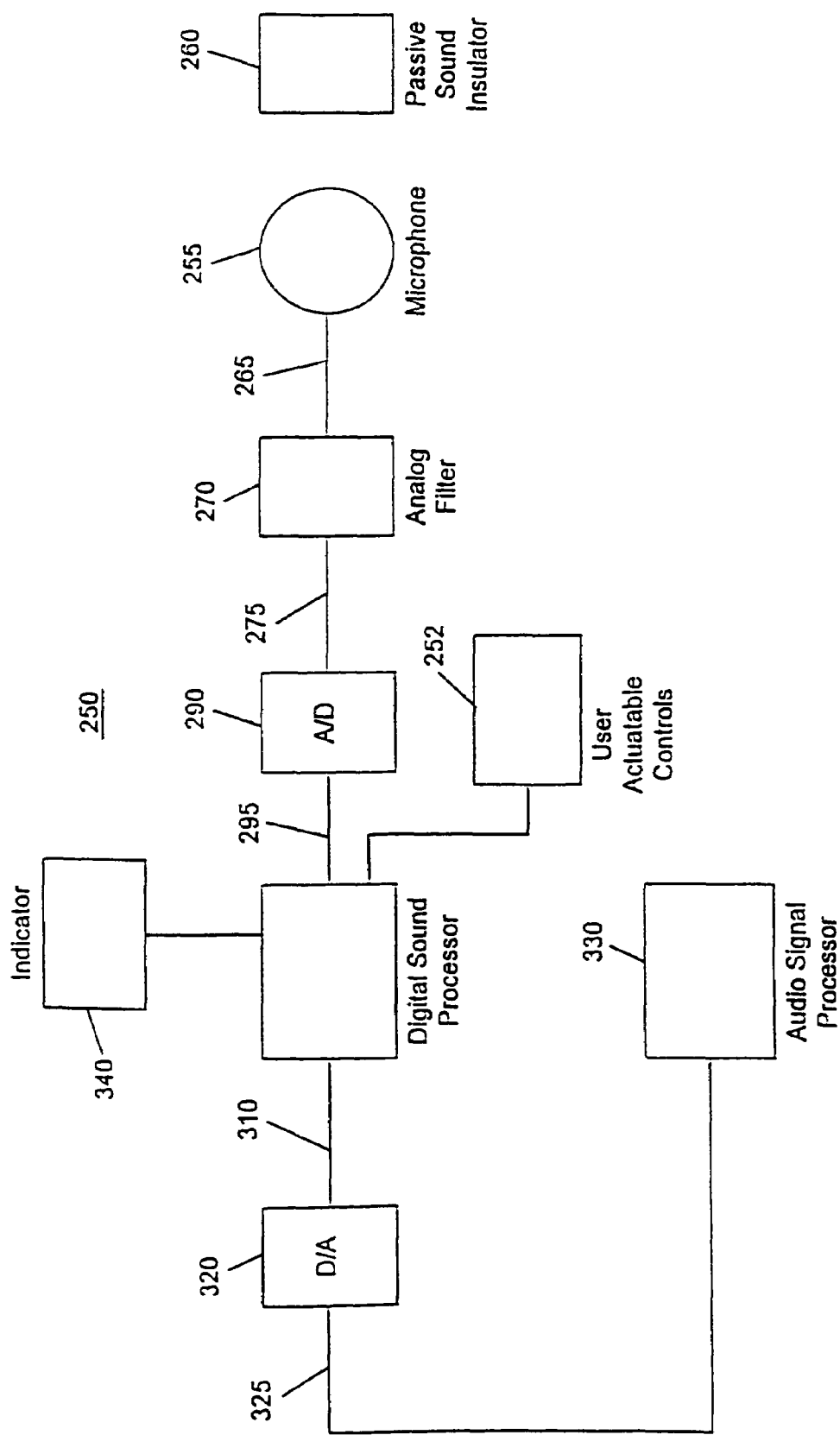
FIG. 11 is a schematic diagram of a first embodiment of a digital sound processing system incorporating the present invention.

Preferably, interior rearview mirror assembly 16 includes at least one microphone coupled with a digital sound processor, most preferably supplied as a module comprising at least one microphone that provides an output to a microprocessor-based control that performs digital sound processing on the microphone output in order to enhance the human vocal signal received and in order to reduce any non-vocal signal components from ambient noise in the vehicle cabin. A preferred rearview mirror digital sound processing system 250 comprises, as shown in FIG. 11, a microphone 255 that detects sounds within the interior of the vehicle in which the interior mirror incorporating digital sound processing system 250 is mounted. Preferably, microphone 255 of digital sound processing system 250 is mounted in mirror housing 16b of mirror assembly 16 (although other locations such as within module 10 or elsewhere on mirror assembly 16 such as at the mirror button mount that mounts to mirror button 16a may be used, depending on the particular model of vehicle involved. Likewise, mounting microphone 255 at, on or in the headliner 14 or as part of a trim item or header console associated with header 14 may also be desirable, depending on the configuration of a particular vehicle). Optionally and preferably, microphone 255 has its zone of sensitivity directed to the expected location in the front of the cabin of the vehicle where a driver's mouth and/or a front-seat passenger's mouth can be expected to be located so as to enhance microphone pick-up of spoken vocal inputs over background noise. Optionally, microphone 255 comprises a single-element, pressure-gradient microphone. Also, and preferably, microphone 255 is acoustically protected from background cabin noise by use of a passive sound insulator 260, as is known in the acoustic arts, and/or by using noise cancelling techniques such as a pressure gradient such as used in a pressure gradient microphone and/or by use of a microphone isolator and/or by use of acoustic baffles . The analog sound output signal 265 of microphone 255 is optionally filtered by analog filter 270 that has a high bandpass for vocal sound frequencies such as less than about 1000 Hertz and that has reduced transmission and/or is blocking to audio frequencies outside the vocal range. The output 275 of analog filter 270 is input to analog to digital (A/D) converter 290 where it is converted from an analog signal to a digital signal 295. Digital signal 295 is processed by digital sound processor 300 where, using digital sound processing techniques as known in the acoustics art and as disclosed and referenced above, the vocal component of digital signal 295 is distinguished from the non-vocal components of digital signal 295 to form a digital vocal signature signal 310 that is output from digital sound processor 300. Preferably, digital sound processor 300 comprises a microprocessor with associated digital memory storage, and most preferably comprises a digital signal processor such as a single-chip microcomputer optimized for digital signal processing and high speed numeric processing such as the ADSP-218x digital signal processors such as the ADSP-2186 single-chip microcomputer, which integrates 40 kilobytes of on-chip memory (including 8K words (24-bit) of program RAM and 8K words (16-bit) of data RAM) along with serial ports, DMA ports, timers, I/O lines, and interrupt capabilities. The ADSP-2186 microcomputer and the ADSP-218x digital signal processors are available from Analog Devices, Inc., Norwood, Mass. It is preferred to use a digital signal processor that comprises a computer-on-a-chip (which is capable of extensive and rapid mathematical/computational processing) as part of the digital sound processor of the current invention as such digital signal processors provide a compact, high-performing and economical microcomputer for utilization in the digital sound processing system accommodated such as in housing 16b of mirror assembly 16. Use of a digital signal processor comprising a fast computational microcomputer as a component of digital sound processing system 250 is particularly preferable when system 250 is operating in voice recognition, vocal verification and/or voice activation mode. Digital vocal signature signal 310 exhibits an increased vocal signal to non-vocal noise signal ratio compared to the vocal signal to non-vocal noise signal ratio of signal 265 output by microphone 255. Vocal signature signal 310 is input to digital to analog (D/A) converter 320 where it is converted to analog vocal signature signal 325. Analog vocal signature signal 325, that has an enhanced vocal to non-vocal signal ratio, is provided as an input to audio signal processor 330. Audio vehicle signal processor 330 is preferably a telecommunication (sometime referred to as a telematic) device comprising a transmitter and receiver in two-way wireless communication (such as by radio frequency communication) with a person and/or device external to and remote from the vehicle in which rearview mirror digital sound processing system 250 is installed (such as within mirror housing 16b or within module 10 of mirror assembly 16). Alternately (or in addition), audio vehicle signal processor 330 can be a voice activated controller for a vehicle function [such as a vehicular radio, entertainment system, climate control system such as a HVAC (heating, ventilation and/or air conditioning) system, seat position and seat configuration controller, mirror reflector positioning system, in-vehicle computer system, dictation and/or messaging system, pager system, cellular phone system, door lock/unlock system, cruise control system, gear change system, headlamp activation/deactivation system, navigation system such as a GPS system, turn signal activation/deactivation system, vehicle ignition system, vehicle security system, sun roof open/close system, vehicle window open/close system, vehicle suspension system adjustment system, vehicle camera system and other similar vehicular functions whose operation is controlled by voice command]. By using rearview mirror digital sound processing system 250, vocal commands and inputs as received at audio vehicle signal processor 330 are substantially free of noise and interference, thus facilitating clarity and accuracy of the voice input to the like of an ONSTAR™ wireless telecommunication system or a voice-activated vehicle accessory such as a vehicular CD or DVD audio entertainment system or an in-vehicle INTERNET interface connected to the worldwide web (such as to access e-mails). Optionally, rearview mirror digital sound processing system 250 may include a voice recognition system that can learn a person's voice signature. For example, digital sound processor 300 may include a voice learn mode whereby, for example, a driver may input his/her voice signature so that digital sound processor 300 preferentially and/or uniquely reacts to that particular voice pattern. Such a voice recognition capability has advantages in a security system (for example the vehicle ignition may be disabled unless rearview mirror digital sound processing system 250 recognizes a voice input from an authorized user, or a cellular phone can remain inoperable unless rearview mirror digital sound processing system 250 recognizes a voice input from an authorized user). Optionally, digital sound processor 300 may store the voice signatures of a variety of authorized users (such as of several members of a family, or employees of a company) so as to allow access to vehicle functions to a restricted group of individuals. Once digital sound processor 300 recognizes a particular authorized user in the vehicle, optionally, a variety of vehicle functions (such as seat position and/or seat configuration, position of the mirror reflector at the interior and/or sideview mirrors and the like) can be set to the predetermined preference setting for that particular individual. Also, digital sound processor 300 may include a learning capability whereby digital sound processor 300 learns from voice recognition events and/or errors experienced during operation of rearview mirror digital sound processing system 250 in the vehicle. Thus, rearview mirror digital sound processing system 250 learns from past voice input/command recognition errors, practices and/or experiences so that rearview mirror digital sound processing system 250 becomes expert over time in recognizing the speech pattern, accent, diction, idioms and dictionary (including unusual words) of individual repetitive users of rearview mirror digital sound processing system 250.

Rearview mirror digital sound processing system 250 also optionally and preferably includes user actuatable input controls 252 that allow the driver and/or other vehicle occupants enter inputs to rearview mirror digital sound processing system 250. Preferably, such controls are push-button or touch-sensitive inputs located such as in the bezel region of mirror housing 16b. Examples of preferred mirror-mounted input controls for rearview mirror digital sound processing system 250 are disclosed in U.S. patent application Ser. No. 09/448, 700, filed Nov. 24, 1999, entitled "Rearview Mirror Assembly with Added Feature Modular Display" to Timothy G. Skiver, et al. of Donnelly Corporation, filed Nov. 24, 1999, the entire disclosure of which is hereby incorporated by reference herein.

Preferably, all the components of rearview mirror digital sound processing system 250 are located at, on or in interior rearview mirror assembly 16 such as within mirror housing 16b. This allows a mirror manufacturer supply a rearview mirror digital sound processing system including a mirror assembly, microphone(s) and digital sound processor as a unified system to an automaker who can then mount the mirror-mounted rearview mirror digital sound processing system onto the vehicle as the vehicle is being assembled on an assembly line at an automobile assembly plant. Most preferably, audio vehicle signal processor 330 (along with any antennae for transmitting and/or receiving wireless signals to and from the vehicle) is also included in mirror assembly 16 (such as in housing 16b) so that that the interior mirror assembly can be supplied to an automaker complete with the microphone, digital sound processor and audio system that receives and acts on the vocal signature signal output by the digital signal processor. Preferably, all components of digital sound processing system 250 can be accommodated in mirror assembly 16, and be shipped to the automaker as a unitary assembly. In this was, a complete wireless telecommunication system [that accomplishes the functions such as achieved by the General Motors (of Detroit, Mich.) ONSTAR™ system or the Ford Motor Company (of Detroit, Mich.) RESCU™ system including operator assisted service and operation in voice recognition mode] can be included as part of interior rearview mirror assembly 16.

Although it is preferable to have most if not all of the components of rearview mirror digital sound processing system 250 be included in mirror assembly 16, the benefits of the present invention can be also obtained by locating some components of rearview mirror digital sound processing system 250 elsewhere within the vehicle at a location separate and spaced from the location of the interior mirror when it is mounted in the vehicle. For example, when rearview mirror digital sound processing system 250 comprises a vehicular wireless communication system such as an ONSTAR™ system, audio vehicle signal processor 330 (along with any antennae for transmitting and/or receiving wireless signals to and from the vehicle) can be located at a location spaced and distant from mirror assembly 16 (such as in the dash/instrument panel portion of the vehicle cabin). In such a configuration, digital sound processor 300 can be located in mirror housing 16b (or elsewhere at, on or in mirror assembly 16) and its output can be provided to the dashboard (or elsewhere) mounted ONSTAR™ or similar audio vehicle signal processor via a wire or a fibre-optic connection. Connection of an interior mirror-mounted digital sound processing system to an audio system remote from the location of the rearview mirror in the vehicle is facilitated by use in the vehicle of vehicular multiplexing systems and accessory connectivity systems such as a car-area-network (also a.k.a controlled-area-network) or a local interactive network such as is disclosed in U.S. Pat. No. 6,158,655 entitled "Vehicle Mounted Remote Transaction Interface System" to DeVries et al of Donnelly Corporation, filed Apr. 8, 1998, the entire disclosure of which is hereby incorporated by reference herein. Also, in order to obviate a physical connection (such as by a wire or cable or via a wired vehicle local area network) between the mirror mounted microphone/sound processor and an audio system such as an ONSTAR™ system that is located in the vehicle at a location remote and spaced from the interior mirror location, a wireless link can be established between the mirror-mounted microphone/sound processing system and the remotely located audio system with which it exchanges signals and data. For example, a microphone or a plurality of microphones as well as a digital sound processor can be mounted in the interior mirror housing, and signals indicative of the vocal input of a human speaker in the vehicle cabin can be wirelessly broadcast such as by radio-frequency transmission (such as using the restricted-range wireless communication BLUETOOTH system described above) or by transmission of a modulated infrared light beam from the interior mirror to an ONSTAR™ system motherboard located in the vehicle instrumentation panel (or elsewhere in the vehicle cabin such as in a roof area). By using wireless linkage (such as a radio frequency communication wireless link or an infrared communication wireless link) between a mirror-based microphone/sound processing system and a component distant from the interior mirror location in the interior vehicular cabin, complexity of wiring of the vehicle can be reduced.

Optionally, digital to analog converter 320 can be positioned at a location distant from the interior mirror assembly (such as part of a dashboard located ONSTAR™ telematic system), and can receive digital vocal signature 310 by digital transmission along an interconnecting wire, cable or wired network, or via digital wireless transmission of signals from the interior mirror assembly to digital to analog converter 320. Also, optionally, digital sound processor 300 can be located remote and distant from the interior mirror assembly, such as part of the circuitry of an ONSTAR™ system. Also, optionally, analog to digital converter 290 and/or analog filter 270 can be located remote and distant from the interior mirror assembly, such as part of the circuitry of an ONSTAR™ system. Depending on the nature of audio vehicle signal processor 330, and depending on the particular construction of a particular vehicle model, digital sound processor 300 can be locate at, on or in the interior mirror assembly, or it may be located remote and distanced therefrom so as to co-share any computational component (such as a microprocessor or microcomputer) present in a remotely-located audio vehicle signal processor 330. However, the interior mirror is a preferred location for some if not all the components of digital sound processing system 250, and particularly for microphone 255. The interior mirror is high mounted in the vehicle at a position close to the talking level of a driver or other occupant. Also, by placing microphone 255 such as in the interior mirror housing 16b and preferably facing the driver, the driver can address the microphone while maintaining both a good forward field of view via the windshield and maintaining a good rearward field of view via mirror reflector 16d. Also, and particularly when mirror assembly 16 comprises an electrically-operated mirror assembly such as an automatic dimming electrochromic mirror assembly or a lighted mirror assembly, or a compass mirror assembly or an added-feature mirror assembly such as is disclosed in U.S. Pat. No. 6,158,655, the entire disclosure of which is hereby incorporated by reference herein, electronic circuitry that is comprised in digital sound processing system 250 can share components with, and printed circuit board space with, other electronic circuitry in the mirror assembly such as automatic glare control circuitry, compass direction circuitry and the like. Also, optionally, any antenna for a wireless communication system such as ONSTAR™ can be located at, on or in mirror assembly 16 (or, alternately, at, on or in a sideview mirror assembly attached to the outside of the vehicle body).

Digital sound processing system 250 optionally includes an indicator 340 (such as described above) that indicates to the driver when voice inputs from the driver (or from any other vehicle occupant) are being clearly and accurately received and processed. Thus, for example, digital sound processor 300 can analyze the quality of digital signal 295 and/or digital vocal signature signal 310 and determine whether the vocal quality of the signal is adequate for low-error or no-error voice recognition. If the signal quality is adequate for voice recognition, indicator 340 can signal such to the driver by a variety of means such as by displaying the alphanumeric text of the spoken message on a display readable by the driver (itself preferably displayed at the mirror assembly) so that the driver can view and confirm and accept what the sound processing system is determining to have been spoken. Alternately, indicator 340 can comprise an indicator light (such as a light emitting diode) that illuminates whenever the sound processor determines that adequate vocal sound volume and/or clarity is being received. Preferably, such an indicator is located at interior mirror assembly 16, as viewing the mirror is part and parcel of the driving task. Thus, for example, should the indicator LED flicker and/or extinguish due to poor pick-up of speech input to digital sound processing system 250, the driver would be prompted to speak-up, turn down any noise creating accessory, repeat or take similar corrective action. Where audio vehicle signal processor 330 comprises a wireless telecommunication system such as ONSTAR™ in communication with a receiver remote to the vehicle, the remote receiver can optionally determine whether the vocal signal as received by transmission from the vehicle is of sufficient vocal quality to facilitate voice recognition and so accurately transcribe/act on spoken alphanumeric text. The remote receiver can transmit back to the vehicle a status indication of the quality of vocal signal as received from the vehicle; and this status can be indicated by indicator 340.

Figure 12:
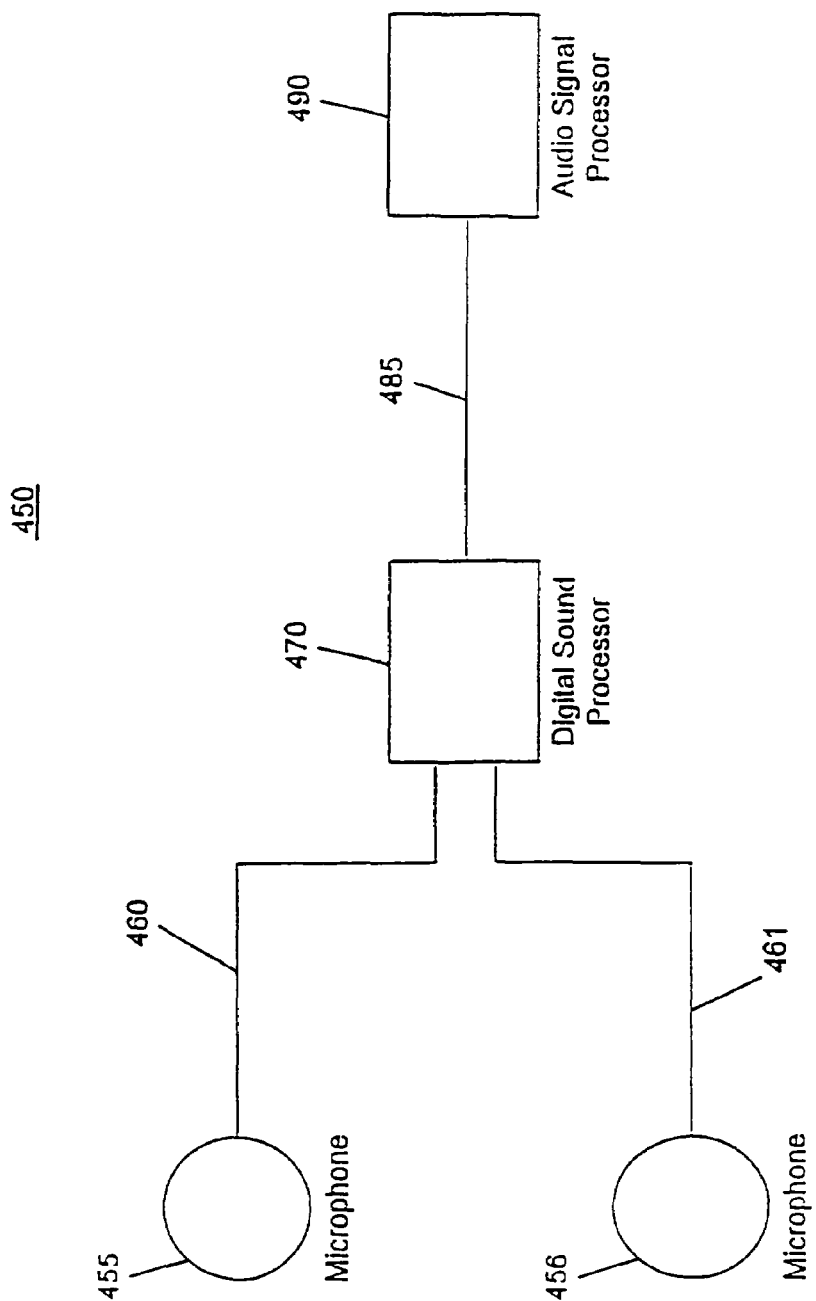
FIG. 12 is a schematic diagram of a second embodiment of a digital sound processing system incorporating the present invention.

FIG. 12 describes a vehicular digital sound processing 450 utilizing two microphones 455, 456 that provide signals 460, 461, respectively, as inputs to digital sound processor 470 which provides vocal signature signal 485 to audio vehicle signal processor 490. Microphone 455, when attached to mirror assembly 16, has its zone of audible sensitivity principally directed towards the expected location of the drivers's mouth in the vehicle cabin and thus, signal 460 is enriched in vocal content but also has included noise components from ambient cabin noise. By contrast, microphone 456 is more omni-directional (optionally, microphone 456 is a boom microphone) that has its zone of sensitivity set to detect ambient noise so that signal 461 is enriched in ambient noise content. By receiving separate inputs (and with each individual input optionally filtered to enhance their principal signal content), digital sound processor 470 can mathematically/computationally analyse the respective inputs, and their combination, in order to extract, using noise cancellation techniques as known in the art, vocal signature signal 485 which is input to audio vehicle signal processor 490 (for example, an ONSTAR™ system) where signal 485 is clearly and accurately received and processed, including in voice recognition mode. Use of at least two microphones in vehicular digital sound processing is beneficial to facilitate generation of high quality vocal signals because destructive interference techniques and/or signal averaging techniques can be utilized to cancel out unwanted noise and to isolate the desired vocal signature signal that is indicative of the alphanumeric words spoken by the driver and/or other vehicle occupant. More than two microphones can be used, such as a four microphone system with a microphone directed to pick-up speech from a driver, a second microphone directed to pick-up speech from a front-seat passenger, and two further microphones directed to pick-up ambient cabin noise.

Figure 13:
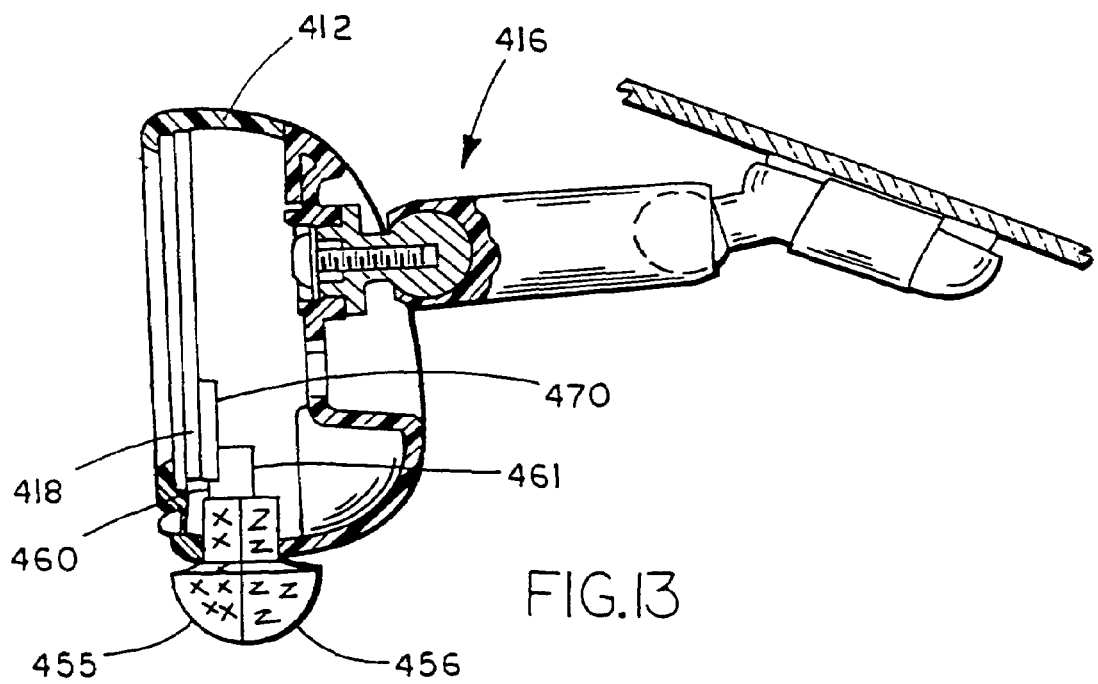
FIG. 13 is a side elevation shown partially in section of an alternate embodiment of an interior rearview mirror assembly incorporating the present invention.

Optionally, microphones 455,456 can be provided in a unitary module such as is shown in interior mirror assembly 416 of FIG. 13, and with microphone 455 facing towards the driver and microphone 456 facing towards the windshield when mirror assembly 416 is mounted in a vehicle. By this arrangement, the zone of sensitivity of microphone 455 is directed towards the driver/front-seat occupants whereas the zone of sensitivity of microphone 456 is directed away from the driver/front-seat occupants (and so better sampling ambient noise sources such as windshield noise such as due to windshield flutter or due to climatic noise due to rain hail or wind impinging the windshield, HVAC noise etc.). The circuitry for digital sound processor 470 (along with any associated filters, power supplies, A/D and D/A converters, connectors, transmitters etc) can be accommodated in mirror housing 412 such as on printed circuit board 418. This construction allows an automaker be supplied with an interior mirror assembly that includes the microphone(s), filters, digital sound processors and associated circuitry to produce a vocal signature signal output that is accurately indicative of the speech detected by the microphone(s). Optionally, and desirably, the vocal signature signal output from the mirror assembly can be provided to a variety of accessories located in the vehicle cabin.

Figure 14:
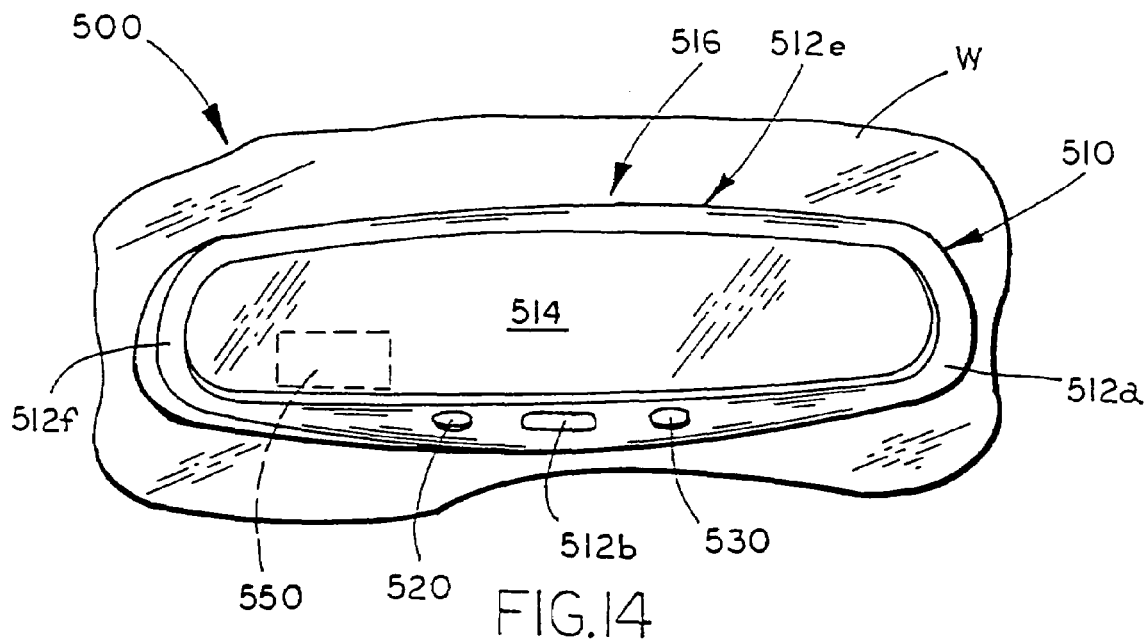
FIG. 14 is a front perspective view of an interior rearview mirror assembly incorporating the present invention.

A two-microphone embodiment of a mirror-mounted digital sound processing system 500 in interior mirror assembly 516 is shown in FIG. 14. Mirror assembly 516 is attached to windshield W of the vehicle. Mirror assembly 516 includes a mirror housing 510 that houses mirror reflective element 514. Mirror housing 510 includes a top bezel portion 512e, a driver-side bezel portion 512f, a passenger-side bezel portion 512a, and a bottom bezel portion 512b. Included in bottom bezel portion 512b is a driver-side microphone 520 and a passenger-side microphone 530. Microphones 520, 530 generally face rearward of the vehicle cabin, and are spaced one from another so that microphone 520 generally has its zone of sensitivity directed to a driver seated in a driver front seat and so that microphone 530 generally has its zone of sensitivity directed to a passenger seated in a passenger front seat. The respective audio outputs of microphones 520,530 are provided to a digital sound processor 550 incorporating a digital signal processing microcomputer located within mirror housing 510 of mirror assembly 516. Digital signal processor 550 preferably utilizes noise-cancelling techniques, as known in the art, to enhance the vocal to non-vocal signal quality of the vocal signature signal output from digital sound processing system 500. Such noise-cancelling techniques include techniques such as echo cancellation including echo cancellation algorithms; beam forming techniques including beamforming digital algorithms and adaptive beamforming; active noise cancellation; open and closed loop noise cancellation; adaptive signal processing techniques and adaptive noise cancellation techniques such that when, for example, speech by a driver is received at and detected by microphone 520, the output from the opposing microphone 530 is analyzed for ambient noise content (and vice versa should speech by a passenger be detected by microphone 530).

Although both microphones in FIG. 14 are shown in the bottom bezel portion, such microphones and/or additional microphones can be located at other bezel portions, or elsewhere at, on or in mirror assembly 516 such as at, on or in a rear portion of housing 510 or at, on or in an eyebrow portion or chin portion or side-protruding portion of the mirror housing and/or bezel.

Also, when an array of multiple mirror-mounted microphones is used, such as two or more (more preferably three or more, most preferably four or more), the individual outputs of the multiple microphones can be digitally filtered, and adaptive beamforming, as is known in the acoustic art, can be utilized to enhance the desire vocal signal content and to reduce or eliminate acoustic noise. Adaptive beamforming comprising a microphone array that isolates vocal content while reducing noise is available from Andrea Electronics Corporation of Melville, N.Y. under the trade name Digital Super Directional Array (DSDA™) technology.

Figure 16:
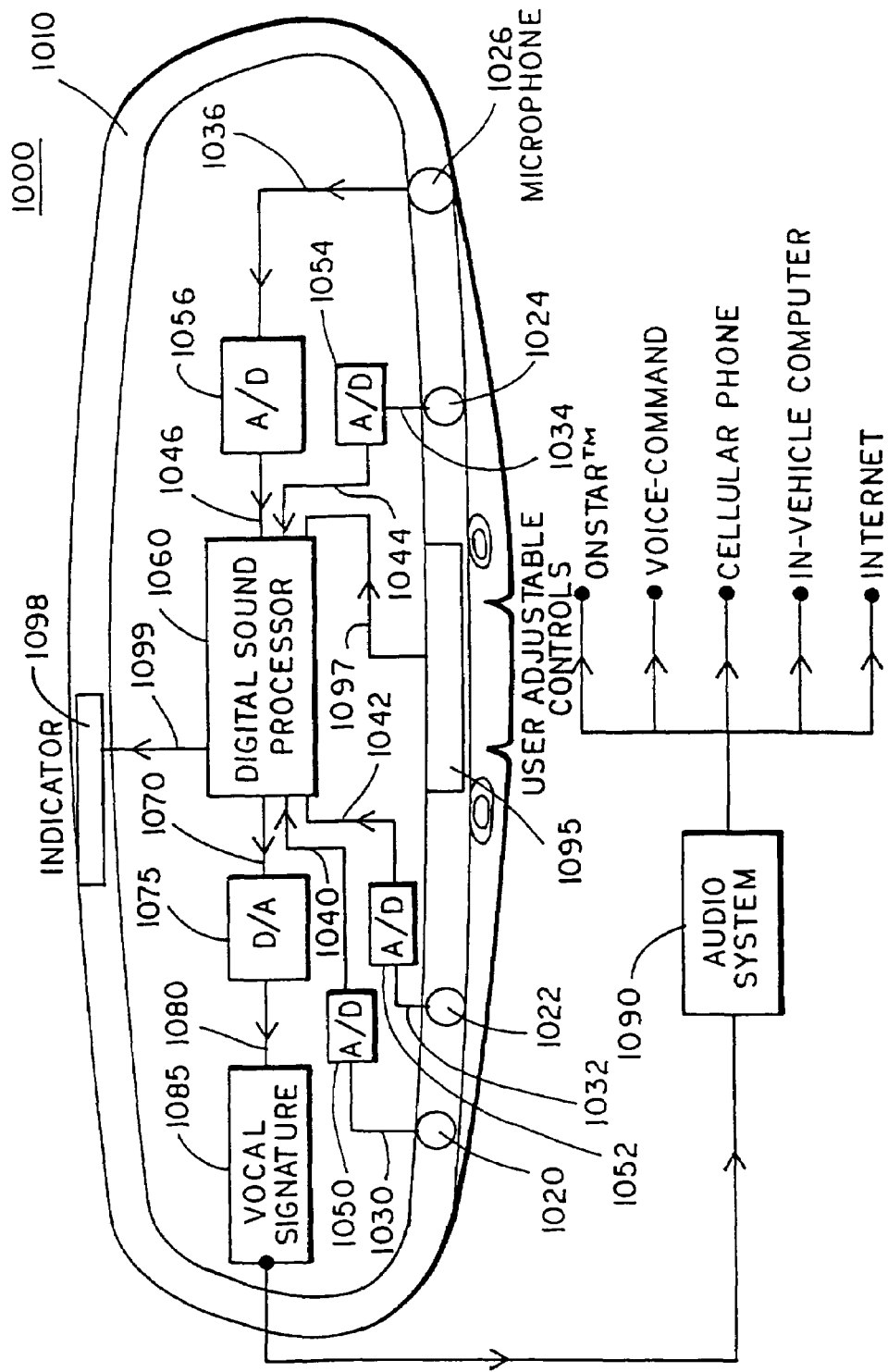
FIG. 16 is a schematic diagram of a further embodiment of a digital sound processing system incorporating the present invention.

Referring to FIG. 16, mirror-mounted digital sound processing system 1000 is mounted in interior rearview mirror housing 1010. Four microphones, 1020, 1022, 1024 and 1026, are positioned to detect sound via apertures in the front, lower bezel portion of housing 1010. The respective analog signal outputs 1030,1032,1034,1036 of microphones 1020, 1022,1024,1026 are converted to digital signals 1040,1042, 1044,1046 by analog to digital converters 1050,1052,1054, 1056. Digital signals 1040,1042,1044,1046, which are indicative of vocal inputs due to speech in the vehicle cabin with vehicle cabin noise superimposed thereon, are input to digital sound processor 1060 which comprises a microcomputer that processes digital signals 1040,1042,1044,1046 and that applies noise cancellation techniques, as disclosed and referenced above, to produce digital vocal signature signal 1070 which has substantially reduced vehicle cabin noise content due to the noise cancellation performed by digital sound processor 1060. Digital vocal signature signal 1070 is provided to digital to analog converter 1075 which provides analog signature signal 1080 (which has substantially reduced vehicle cabin noise content due to the noise cancellation performed by digital sound processor 1060) to vocal signature output connector 1085. Vocal signature connector 1085 is connected to audio system 1090 (that may comprise an ONSTAR™ wireless telecommunication system, a cellular phone system, an in-vehicle computer system, a voice-command control system, an INTERNET system or a similar voice-interacting system, most preferably operating in voice recognition mode) in order to provide analog vocal signal 1080 to audio system 1090. Audio system 1090 is located at a distance from the location of interior mirror housing 1010 when mounted in the vehicle cabin (such as in a vehicular dash area or in an instrument panel area or in a roof area such as a roof console area). User actuatable controls 1095 provide a manually selected control signal 1097 to digital sound processor 1060. Indicator 1098 receives a signal 1099 from digital sound processor 1060. Signal 1099 is indicative of the voice recognition accuracy of the vocal signature signal output by digital sound processor 1060.

The invention is not limited to the embodiments described herein which may be modified or varied without departing from the scope of the invention. Changes and modifications in the specifically described embodiments can be carried out without departing from the principles of the invention, which is intended to be limited only by the scope of the appended claims, as interpreted according to the principles of patent law.

The invention claimed is:

1. A digital sound processing system suitable for use in a vehicle, said digital sound processing system comprising:
    an interior rearview mirror assembly;
    said interior mirror assembly including at least a first microphone and a second microphone;
    said first microphone generating a first signal indicative of a vocal input with vehicle cabin noise included therewith;
    said second microphone generating a second signal indicative of a vocal input with vehicle cabin noise included therewith;
    a digital signal processor;
    said digital signal processor processing said first signal and said second signal and providing an output signal with reduced vehicle cabin noise; and
    wherein said digital signal processor comprises a microprocessor, said microprocessor executing at least one million instructions per second.

2. The digital sound processing system of claim 1, wherein said microprocessor executes at least five million instructions per second.

3. The digital sound processing system of claim 2, wherein said digital sound processing system includes an indicator operable to indicate at least one of clarity and volume of said output signal.

4. The digital sound processing system of claim 1, wherein said first signal is digitized by a first analog to digital converter.

5. The digital sound processing system of claim 4, wherein said second signal is digitized by a second analog to digital converter.

6. The digital sound processing system of claim 1, wherein said interior rearview mirror assembly is adapted to mount to one of an interior surface of a windshield of the vehicle and a headliner extending along an upper edge of the windshield.

7. The digital sound processing system of claim 1, wherein said digital signal processor comprises a microcomputer.

8. The digital sound processing system of claim 1, wherein said rearview mirror assembly comprises a mirror casing having a reflective element disposed thereat and wherein at least one of said first microphone and said second microphone is included in said mirror casing.

9. The digital sound processing system of claim 8, wherein said first microphone and said second microphone are included in said mirror casing.

10. The digital sound processing system of claim 1, wherein said digital signal processor is included in said rearview mirror assembly.

11. The digital sound processing system of claim 1, wherein said first microphone and said second microphone are disposed in a microphone module.

12. The digital sound processing system of claim 11, wherein at least a portion of said microphone module is accommodated to the rear of a reflective element of said rearview mirror assembly.

13. The digital sound processing system of claim 12, wherein said microphone module provides an input to a vehicular telematics system.

14. The digital sound processing system of claim 1, wherein said rearview mirror assembly comprises a mirror casing having a reflective element disposed thereat and wherein said digital signal processor is included in said mirror casing.

15. The digital sound processing system of claim 1, wherein said output signal is provided to at least one of a cellular phone, an emergency communication system, a voice recorder and a voice command system.

16. The digital sound processing system of claim 3, wherein said indicator provides an indication of the status of a security alarm.

17. The digital sound processing system of claim 1, wherein said digital signal processor is located in the vehicle remote and distant from said interior rearview mirror assembly.

18. The digital sound processing system of claim 17, wherein said digital signal processor communicatively links to said interior mirror assembly via a short-range wireless communication link.

19. The digital sound processing system of claim 1, including a learning mode.

20. The digital sound processing system of claim 1, wherein said rearview mirror assembly comprises a mirror casing having a reflective element disposed thereat and wherein at least one of said first microphone and said second microphone is located at a location chosen from the group consisting of a rear portion of said mirror casing, a bezel portion of said mirror casing, a side portion of said mirror casing, an upper portion of said mirror casing, and a lower portion of said mirror casing.

21. The digital sound processing system of claim 1, wherein said rearview mirror assembly comprises a mirror casing having a reflective element disposed thereat and wherein said first microphone and said second microphone are both located at a location chosen from the group consisting of a rear portion of said mirror casing, a bezel portion of said mirror casing, a side portion of said mirror casing, an upper portion of said mirror casing, and a lower portion of said mirror casing.

22. The digital sound processing system of claim 1, wherein said rearview mirror assembly comprises a mirror casing having a reflective element disposed thereat and wherein at least one of said first microphone and said second microphone is located at an upper portion of said mirror casing.

23. The digital sound processing system of claim 1, wherein said rearview mirror assembly comprises a mirror casing having a reflective element disposed thereat and wherein said first microphone and said second microphone are both located at an upper portion of said mirror casing.

24. The digital sound processing system of claim 1, wherein said rearview mirror assembly comprises a mirror casing having a reflective element disposed thereat and wherein at least one of said first microphone and said second microphone is located at a lower portion of said mirror casing.

25. The digital sound processing system of claim 1, wherein said rearview mirror assembly comprises a mirror casing having a reflective element disposed thereat and wherein said first microphone and said second microphone are both located at a lower portion of said mirror casing.

26. The digital sound processing system of claim 1, wherein noise reaching at least one of said first microphone and said second microphone is reduced by a passive sound insulator.

27. The digital sound processing system of claim 1, wherein said microprocessor processes at least one of an echo cancellation algorithm, a beam forming algorithm, and a noise cancellation algorithm.

28. A digital sound processing system suitable for use in a vehicle, said digital sound processing system comprising:
   an interior rearview mirror assembly;
   said interior mirror assembly including at least a first microphone and a second microphone;
   said first microphone generating a first signal indicative of a vocal input with vehicle cabin noise included therewith;
   said second microphone generating a second signal indicative of a vocal input with vehicle cabin noise included therewith;
   a digital signal processor;
   said digital signal processor processing said first signal and said second signal and providing an output signal with reduced vehicle cabin noise; and
   wherein noise reaching at least one of said first microphone and said second microphone is reduced by a passive sound insulator.

29. The digital sound processing system of claim 28, wherein said microprocessor executes at least one million instructions per second.

30. The digital sound processing system of claim 29, wherein said digital sound processing system including an indicator operable to indicate at least one of clarity and volume of said output signal.

31. The digital sound processing system of claim 28, wherein said first signal is digitized by a first analog to digital converter.

32. The digital sound processing system of claim 31, wherein said second signal is digitized by a second analog to digital converter.

33. The digital sound processing system of claim 28, wherein said interior rearview mirror assembly is adapted to mount to one of an interior surface of a windshield of the vehicle and a headliner extending along an upper edge of the windshield.

34. The digital sound processing system of claim 28, wherein said digital signal processor comprises a microcomputer.

35. The digital sound processing system of claim 28, wherein said rearview mirror assembly comprises a mirror casing having a reflective element disposed thereat and wherein at least one of said first microphone and said second microphone is included in said mirror casing.

36. The digital sound processing system of claim 35, wherein said first microphone and said second microphone are included in said mirror casing.

37. The digital sound processing system of claim 28, wherein said digital signal processor is included in said rearview mirror assembly.

38. The digital sound processing system of claim 28, wherein said first microphone and said second microphone are disposed in a microphone module.

39. The digital sound processing system of claim 38, wherein at least a portion of said microphone module is accommodated to the rear of a reflective element of said rearview mirror assembly.

40. The digital sound processing system of claim 39, wherein said microphone module provides an input to a vehicular telematics system.

41. The digital sound processing system of claim 28, wherein said rearview mirror assembly comprises a mirror casing having a reflective element disposed thereat and wherein said digital signal processor is included in said mirror casing.

42. The digital sound processing system of claim 28, wherein said output signal is provided to at least one of a cellular phone, an emergency communication system, a voice recorder and a voice command system.

43. The digital sound processing system of claim 30, wherein said indicator provides an indication of the status of a security alarm.

44. The digital sound processing system of claim 28, wherein said digital signal processor is located in the vehicle remote and distant from said interior rearview mirror assembly.

45. The digital sound processing system of claim 44, wherein said digital signal processor communicatively links to said interior mirror assembly via a short-range wireless communication link.

46. The digital sound processing system of claim 28, wherein said rearview mirror assembly comprises a mirror casing having a reflective element disposed thereat and wherein said reflective element comprises an electro-optic reflective element.

47. The digital sound processing system of claim 28, wherein said rearview mirror assembly comprises a mirror casing having a reflective element disposed thereat and wherein at least one of said first microphone and said second microphone is located at a location chosen from the group consisting of a rear portion of said mirror casing, a bezel portion of said mirror casing, a side portion of said mirror casing, an upper portion of said mirror casing, and a lower portion of said mirror casing.

48. The digital sound processing system of claim 28, wherein said rearview mirror assembly comprises a mirror casing having a reflective element disposed thereat and wherein said first microphone and said second microphone are both located at a location chosen from the group consisting of a rear portion of said mirror casing, a bezel portion of said mirror casing, a side portion of said mirror casing, an upper portion of said mirror casing, and a lower portion of said mirror casing.

49. The digital sound processing system of claim 28, wherein said rearview mirror assembly comprises a mirror casing having a reflective element disposed thereat and wherein at least one of said first microphone and said second microphone is located at an upper portion of said mirror casing.

50. The digital sound processing system of claim 28, wherein said rearview mirror assembly comprises a mirror casing having a reflective element disposed thereat and wherein said first microphone and said second microphone are both located at an upper portion of said mirror casing.

51. The digital sound processing system of claim 28, wherein said rearview mirror assembly comprises a mirror casing having a reflective element disposed thereat and wherein at least one of said first microphone and said second microphone is located at a lower portion of said mirror casing.

52. The digital sound processing system of claim 28, wherein said rearview mirror assembly comprises a mirror casing having a reflective element disposed thereat and wherein said first microphone and said second microphone are both located at a lower portion of said mirror casing.

53. The digital sound processing system of claim 28, wherein said microprocessor processes at least one of an echo cancellation algorithm, a beam forming algorithm, and a noise cancellation algorithm.

54. A digital sound processing system suitable for use in a vehicle, said digital sound processing system comprising:
an interior rearview mirror assembly;
said interior mirror assembly including at least a first microphone and a second microphone;
said first microphone generating a first signal indicative of a vocal input with vehicle cabin noise included therewith;
said second microphone generating a second signal indicative of a vocal input with vehicle cabin noise included therewith;
a digital signal processor;
said digital signal processor processing said first signal and said second signal and providing an output signal with reduced vehicle cabin noise;
wherein said rearview mirror assembly comprises a mirror casing having a reflective element disposed thereat; and
wherein at least one of said first microphone and said second microphone is located at a location chosen from the group consisting of a rear portion of said mirror casing, a bezel portion of said mirror casing, a side portion of said mirror casing, an upper portion of said mirror casing, and a lower portion of said mirror casing.

55. The digital sound processing system of claim 54, wherein said microprocessor executes at least one million instructions per second.

56. The digital sound processing system of claim 55, wherein said digital sound processing system including an indicator operable to indicate at least one of clarity and volume of said output signal.

57. The digital sound processing system of claim 54, wherein said first signal is digitized by a first analog to digital converter.

58. The digital sound processing system of claim 57, wherein said second signal is digitized by a second analog to digital converter.

59. The digital sound processing system of claim 54, wherein said interior rearview mirror assembly is adapted to mount to one of an interior surface of a windshield of the vehicle and a headliner extending along an upper edge of the windshield.

60. The digital sound processing system of claim 54, wherein said digital signal processor comprises a microcomputer.

61. The digital sound processing system of claim 54, wherein said rearview mirror assembly comprises a mirror casing having a reflective element disposed thereat and wherein at least one of said first microphone and said second microphone is included in said mirror casing.

62. The digital sound processing system of claim 61, wherein said first microphone and said second microphone are included in said mirror casing.

63. The digital sound processing system of claim 54, wherein said digital signal processor is included in said rearview mirror assembly.

64. The digital sound processing system of claim 54, wherein said first microphone and said second microphone are disposed in a microphone module.

65. The digital sound processing system of claim 64, wherein at least a portion of said microphone module is accommodated to the rear of a reflective element of said rearview mirror assembly.

66. The digital sound processing system of claim 65, wherein said microphone module provides an input to a vehicular telematics system.

67. The digital sound processing system of claim 54, wherein said digital signal processor is included in said mirror casing.

68. The digital sound processing system of claim 54, wherein said output signal is provided to at least one of a cellular phone, an emergency communication system, a voice recorder and a voice command system.

69. The digital sound processing system of claim 56, wherein said indicator provides an indication of the status of a security alarm.

70. The digital sound processing system of claim 54, wherein said digital signal processor is located in the vehicle remote and distant from said interior rearview mirror assembly.

71. The digital sound processing system of claim 70, wherein said digital signal processor communicatively links to said interior mirror assembly via a short-range wireless communication link.

72. The digital sound processing system of claim 54, wherein said reflective element comprises an electro-optic reflective element.

73. The digital sound processing system of claim 54, wherein noise reaching at least one of said first microphone and said second microphone is reduced by a passive sound insulator.

74. The digital sound processing system of claim 54, wherein said first microphone and said second microphone are both located at a location chosen from the group consisting of a rear portion of said mirror casing, a bezel portion of said mirror casing, a side portion of said mirror casing, an upper portion of said mirror casing, and a lower portion of said mirror casing.

75. The digital sound processing system of claim 54, wherein at least one of said first microphone and said second microphone is located at an upper portion of said mirror casing.

76. The digital sound processing system of claim 54, wherein said first microphone and said second microphone are both located at an upper portion of said mirror casing.

77. The digital sound processing system of claim 54, wherein at least one of said first microphone and said second microphone is located at a lower portion of said mirror casing.

78. The digital sound processing system of claim 54, wherein said first microphone and said second microphone are both located at a lower portion of said mirror casing.

79. The digital sound processing system of claim 54, wherein said microprocessor processed at least one of an echo cancellation algorithm, a beam forming algorithm, and a noise cancellation algorithm.

* * * * *

UNITED STATES PATENT AND TRADEMARK OFFICE
CERTIFICATE OF CORRECTION

PATENT NO. : 7,542,575 B2
APPLICATION NO. : 11/052623
DATED : June 2, 2009
INVENTOR(S) : Jonathan E. DeLine et al.

It is certified that error appears in the above-identified patent and that said Letters Patent is hereby corrected as shown below:

Column 1:
Line 16, "in-pan" should be --in-part--.
Line 24, "2300" should be --2000--.
Line 25, "Set." should be --Ser.--.

Column 16:
Line 61, "pixilated" should be "pixelated".

Column 20:
Line 61, "electrochromic(EC)" should be --electrochromic (EC)--.

Column 21:
Line 1, Insert --at-- before "at least".
Line 18, Insert --at-- before "at least".

Column 22:
Line 52, "5,796,17" should be --5,796,176--.

Column 36:
Line 48, Delete "s" after "header".

Column 38:
Line 14, "." should be --,-- after "24".

Column 44:
Line 45, "mirror mounted" should be --mirror-mounted--.

Column 48:
Line 42, Claim 1, Insert --rearview-- before "mirror".

Column 50:
Line 38, Claim 28, Insert --rearview-- before "mirror".

UNITED STATES PATENT AND TRADEMARK OFFICE
CERTIFICATE OF CORRECTION

PATENT NO. : 7,542,575 B2
APPLICATION NO. : 11/052623
DATED : June 2, 2009
INVENTOR(S) : Jonathan E. DeLine et al.

It is certified that error appears in the above-identified patent and that said Letters Patent is hereby corrected as shown below:

Column 52:
Line 34, Claim 54, Insert --rearview-- before "mirror".

Signed and Sealed this

Thirteenth Day of October, 2009

David J. Kappos
*Director of the United States Patent and Trademark Office*